(12) United States Patent
Tsuruoka et al.

(10) Patent No.: US 6,721,003 B1
(45) Date of Patent: Apr. 13, 2004

(54) IMAGE PROCESSING APPARATUS AND STORAGE MEDIUM STORING IMAGE PROCESSING PROGRAM

(75) Inventors: Takao Tsuruoka, Machida (JP); Taketo Tsukioka, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/493,747

(22) Filed: Jan. 27, 2000

(30) Foreign Application Priority Data

Jan. 29, 1999 (JP) .......................................... 11-022062

(51) Int. Cl.[7] ........................ H04N 5/262; H04N 9/083; H04N 5/228; H04N 1/46; G06K 9/32
(52) U.S. Cl. ................. 348/240.2; 348/273; 348/208.6; 348/252; 358/525; 382/300
(58) Field of Search .............................. 348/222.1, 252, 348/253, 272, 273, 208.6, 240.2, 262; 358/525; 382/266, 300

(56) References Cited

U.S. PATENT DOCUMENTS

| | | | | |
|---|---|---|---|---|
| 5,552,825 A | * | 9/1996 | Talluri et al. | 348/222.1 |
| 5,652,621 A | * | 7/1997 | Adams et al. | 348/272 |
| 5,668,596 A | * | 9/1997 | Vogel | 348/222.1 |
| 5,953,465 A | * | 9/1999 | Saotome | 382/300 |
| 6,160,635 A | * | 12/2000 | Usami | 358/525 |
| 6,563,538 B1 | * | 5/2003 | Utagawa | 348/273 |
| 6,633,409 B1 | * | 10/2003 | Yamazaki | 358/525 |

FOREIGN PATENT DOCUMENTS

| | | | |
|---|---|---|---|
| JP | 5-56446 | 3/1993 | |
| JP | 08016770 A | * 1/1996 | ............. G06T/5/00 |

OTHER PUBLICATIONS

"Handbook of Image Input Technique", 1st Ed., Nikkan Kogyo Shimbun, Mar. 31, 1992, pp. 143–145 and pp. 259–260; Edited by Yuji Kiuchi.

* cited by examiner

Primary Examiner—Wendy R. Garber
Assistant Examiner—John M Villecco
(74) Attorney, Agent, or Firm—Frishauf, Holtz, Goodman & Chick, P.C.

(57) ABSTRACT

An image processing apparatus has a one CCD, two CCD, or three CCD with spatial pixel offset imaging system. A parameter calculation section sequentially scans an image signal in units of pixels and calculates a parameter for region segmentation from at least one neighboring region containing the current pixel of interest. An image signal segmentation section segments the image signal into uniform regions having single color correlation on the basis of the calculated parameters. A regression section regresses, to a linear formula, the color correlation between color signals in the uniform region. A restoring section restores a missing color signal on the basis of the linear formula and the color signals present in the uniform region.

22 Claims, 22 Drawing Sheets

| CLASS | GRADIENT |
|---|---|
| 0 | $I_R = I_G = I_B$ |
| 1 | $I_B > I_G > I_R$ |
| 2 | $I_R = I_B > I_G$ |
| 3 | $I_R > I_B > I_G$ |
| 4 | $I_R > I_G = I_B$ |
| 5 | $I_R > I_G > I_B$ |
| 6 | $I_R = I_G > I_B$ |
| 7 | $I_G > I_R > I_B$ |
| 8 | $I_G > I_R = I_B$ |
| 9 | $I_G > I_B > I_R$ |
| 10 | $I_G = I_B > I_R$ |
| 11 | $I_B > I_G > I_R$ |
| 12 | $I_B > I_R = I_G$ |
| 13 | UNDETERMINED |

FIG. 5

| Ye | Cy |
|----|----|
| Mg | G  |
| Ye | Cy |
| G  | Mg |

FIG. 9A

| Ye | Cy | Ye | Cy | Ye | Cy |
|----|----|----|----|----|----|
| Mg | G  | Mg | G  | Mg | G  |
| Ye | Cy | Ye | Cy | Ye | Cy |
| G  | Mg | G  | Mg | G  | Mg |
| Ye | Cy | Ye | Cy |    |    |
| Mg | G  | Mg | G  |    |    |
| Ye | Cy | Ye | Cy |    |    |
| G  | Mg | G  | Mg |    |    |

FIG. 9B

IMAGE PROCESSING APPARATUS AND STORAGE MEDIUM STORING IMAGE PROCESSING PROGRAM

BACKGROUND OF THE INVENTION

The present invention relates to an image processing apparatus and storage medium storing an image processing program.

FIG. 22 is a view showing a representative electronic still camera system. Image data obtained by photographing an object with an electronic still camera 804 shown in (a) of FIG. 22 is normally stored in a memory card 805 shown in (b) of FIG. 22. When a color printer 801 shown in (c) of FIG. 22 is connected via a connection cable, a color image can be printed on a medium of a size as small as about A6.

The memory card 805 stored in a predetermined adapter can be inserted into a docking station 802 shown in (d) of FIG. 22. An image can be observed on a TV monitor 800 shown in (e) of FIG. 22 through the docking station 802. When an MO drive 803 shown in (f) of FIG. 22 is connected to the docking station 802, image data can be stored in an MO disk 806 shown in (g) of FIG. 22.

Image data obtained by the electronic still camera 804 can be transferred to a desktop personal computer 809 shown in (h) of FIG. 22 through a connection cable. When the memory card 805 is stored in a predetermined adapter, image data can be loaded into a notebook personal computer 810. In addition, image data in the MO disk 806 can be transferred to the notebook personal computer 810 through a predetermined MO drive. The monitor of the desktop personal computer 809 or the liquid crystal screen of the notebook personal computer 810 is capable of more precise display than the TV monitor 800. An image can be printed by connecting a color printer 811 shown in (j) of FIG. 22, which is larger than the color printer 801, to the desktop personal computer 809 or notebook personal computer 810 via a connection cable.

In the above electronic still camera system, the number of pixels of the electronic still camera is generally about 640×480 (about 300,000 pixels) to 1,280×1,024 (about 1,300,000 pixels). A TV monitor requires about 300,000 pixels, the monitor of a personal computer requires about 1,000,000 pixels, printing at 300 dpi on A6-sized paper requires about 1,300,000 pixels, and printing on A4-sized paper requires about 5,000,000 pixels. Even in the electronic still camera, the number of pixels relatively decreases upon digital zoom or photographing in a size ½×½ the number of pixels in accordance with the image quality mode. In the entire system, the number of pixels for input does not match that required for output in many cases.

Such an electronic still camera generally uses an imaging system using a one CCD, two CCD, or three CCD with spatial pixel offset. As a technique of improving resolution by spatial pixel offset, a general description is given in, e.g., Yuji Kiuchi, ed., "Handbook of Image Input Technique", 1st Ed., Nikkan Kogyo Shimbun, Mar. 31. 1992, pp. 143–145 and pp. 259–260.

In this imaging system, one pixel is comprised of a plurality of color signals, and at least one color signal is often missed in accordance with the pixel position.

FIG. 23 shows the layout of complementary color mosaic filters of cyan (Cy), magenta (Mg), yellow (Ye), and green (G) generally used in a one CCD imaging system. Referring to FIG. 23, for the nth line and (n+1)th line of an even field, luminance signals are represented by $Y_{e,n}$ and $Y_{e,n+1}$, respectively, and color difference signals are represented by $C_{e,n}$ and $C_{e,n+1}$, respectively. For the nth line and (n+1)th line of an odd field, luminance signals are represented by $Y_{o,n}$ and $Y_{o,n+1}$, respectively, and color difference signals are represented by $C_{o,n}$ and $C_{o,n+1}$, respectively. These signals are given by $$Y_{o,n}=Y_{o,n+1}=Y_{e,n}=Y_{e,n+1}=2R+3G+2B \qquad (1)$$

$$C_{o,n}=C_{e,n}=2R-G \qquad (2)$$

$$C_{o,n+1}=C_{e,n+1}=2B-G \qquad (3)$$

where Cy, Mg, and Ye are represented, using G, red (R), and blue (B), by $$Cy=G+B \qquad (4)$$

$$Mg=R+B \qquad (5)$$

$$Ye=R+G \qquad (6)$$

As is represented by equation (1), luminance signals are generated in correspondence with all lines of even and odd fields. However, two color difference signals are generated only every other line, and each missing line is compensated by linear interpolation. After this, matrix calculation is performed to obtain three primary colors of R, G, and B. In this method, the color difference signal has an information amount only ½ that of the luminance signal, so an artifact called color moire is generated at an edge portion. Generally, to reduce color moire, a low-pass filter using a quartz filter is arranged on the front side of the imaging element. However, when the low-pass filter is inserted, the resolution becomes low.

Instead of simple interpolation using only the color difference signal, methods of correcting the color difference signal using the luminance signal component have been proposed. As one method, a luminance signal Y is prepared by linear interpolation. A color difference signal C is compensated by linear interpolation in a region where the change amount of the luminance signal Y is small. In a region where the change amount is large, the luminance signal Y is rearranged as $$C'=aY+b \qquad (7)$$

where a and b are constants to obtain a restored color difference signal C'.

In a technique disclosed in Jpn. Pat. Appln. KOKAI Publication No. 5-56446, the luminance signal Y is prepared by linear interpolation. For the color difference signal C, the luminance signal Y and color difference signal C are processed by a low-pass filter constructed by an electrical circuit to obtain their low-frequency components $Y_{low}$ and $C_{low}$. The color difference signal C' in which missing information is restored can be obtained by $$C' = Y\frac{C_{low}}{Y_{low}} \qquad (8)$$

This amounts to replacement of the color difference signal with a corrected luminance signal. In the above prior art, the color difference signal is corrected with reference to the luminance signal, though the luminance signal has an information amount only ½ that of the three CCD imaging system. In these techniques as well, a low-pass filter using a quartz filter must be used to reduce color moiré. For this reason, the resolution of the luminance signal serving as a reference further lowers, and an image quality equivalent to that of the three CCD imaging system cannot be realized.

As described above, in the prior art, a color difference signal is compensated by linear interpolation or on the basis of a luminance signal, and a missing color signal cannot be accurately restored at a high speed. Under the circumstance, the present invention has as its object to provide an image processing apparatus capable of accurately restoring a missing color signal at a high speed.

In the prior art, a luminance signal or color difference signal is generated by simple addition/subtraction in units of lines independently of edges or color boundaries in an image. Hence, false colors generated at edges or color boundaries cannot be reduced without sacrificing resolution. Under the circumstance, the present invention has as another object to provide an image processing apparatus capable of reducing false colors generated at edges or color boundaries without decreasing resolution.

In the prior art, a signal is processed without considering the relationship between the number of pixels of the imaging system and that of the output system, and therefore, an appropriate image quality cannot be obtained in an appropriate processing time. Under the circumstance, the present invention has as still another object to provide an image processing apparatus capable of obtaining an appropriate image quality in an appropriate processing time.

In the prior art, a signal is processed without considering the relationship between the number of pixels of the imaging system and that of the output system, and therefore, an appropriate image quality cannot be obtained by automatic processing in an appropriate processing time. Under the circumstance, the present invention has as still another object to provide an image processing apparatus capable of obtaining an appropriate image quality by automatic processing in an appropriate processing time.

In the prior art, a signal is processed without considering the relationship between the number of pixels of the imaging system and that of the output system, and therefore, priority cannot be given to one of the processing time and image quality which the user chooses. Under the circumstance, the present invention has as still another object to provide an image processing apparatus capable of processing a signal while giving priority to one of the processing time and image quality which the user chooses.

In the prior art, a color difference signal is compensated by linear interpolation or on the basis of a luminance signal, and therefore, a missing color signal cannot be accurately restored. Additionally, a signal obtained by compensating for a missing color signal once by linear interpolation or on the basis of a luminance signal cannot be processed again and accurately restored. Under the circumstance, the present invention has as still another object to provide an image processing apparatus capable of accurately restoring a color signal even after it is processed by linear interpolation or the like.

BRIEF SUMMARY OF THE INVENTION

In order to achieve the above objects, according to the first aspect of the present invention, there is provided an image processing apparatus having a one CCD, two CCD, or three CCD with spatial pixel offset imaging system, comprising:

a parameter calculation section for sequentially scanning an image signal in units of pixels and calculating a parameter for region segmentation from at least one neighboring region containing a current pixel of interest;

an image signal segmentation section for segmenting the image signal into uniform regions having single color correlation on the basis of parameters calculated by the parameter calculation section;

a regression section for regressing, to a linear formula, the color correlation between color signals present in the uniform region segmented by the image signal segmentation section; and a first restoring section for restoring a missing color signal on the basis of the linear formula and the color signals present in the uniform region segmented by the image signal segmentation section.

According to the second aspect of the present invention, there is provided an image processing apparatus having a one CCD, two CCD, or three CCD with spatial pixel offset imaging system, comprising:

a local region extraction section for sequentially scanning an image signal in units of pixels and extracting a local region containing a current pixel of interest;

a parameter calculation section for setting a plurality of small regions in the local region extracted by the local region extraction section and calculating a parameter for region segmentation from each small region;

a local region segmentation section for segmenting the local region into uniform regions having single color correlation on the basis of parameters calculated by the parameter calculation section;

a selective regression section for selecting color signals belonging to the same region as that of the current pixel of interest in the local region segmented by the local region segmentation section on the basis of the uniform region and regressing color correlation between the color signals to a linear formula; and a first restoring section for selecting color signals belonging to the same region as that of the current pixel of interest in the local region segmented by the local region segmentation section on the basis of the uniform region and restoring a missing color signal in the same region as that of the current pixel of interest on the basis of the color signals and the linear formula.

According to the third aspect of the present invention, there is provided an image processing apparatus having a one CCD, two CCD, or three CCD with spatial pixel offset imaging system, comprising:

a first restoring section for restoring a missing color signal of an image signal sensed by the imaging system by linear interpolation;

a conversion section for converting the image signal restored by the first restoring section into an original image signal obtained by the imaging system;

a second restoring section for restoring a missing color signal of the image signal converted by the conversion section on the basis of color correlation between color signals; and a switching section for switching between the conversion section and the second restoring section.

According to the fourth aspect of the present invention, there is provided a computer-readable storage medium which stores a program comprising an instruction causing a computer to execute:

parameter calculation processing of sequentially scanning, in units of pixels, an image signal obtained by imaging with a one CCD, two CCD, or three CCD with spatial pixel offset imaging system and calculating a parameter for region segmentation from at least one neighboring region containing a current pixel of interest;

image signal segmentation processing of segmenting the image signal into uniform regions having single color correlation on the basis of calculated parameters;

regression processing of regressing, to a linear formula, the color correlation between color signals in the uniform region; and restoring processing of restoring a missing color signal on the basis of the linear formula and the color signals present in the uniform region.

According to the fifth aspect of the present invention, there is provided a computer-readable storage medium which stores a program comprising an instruction causing a computer to execute:

local region extraction processing of sequentially scanning, in units of pixels, an image signal obtained by imaging with a one CCD, two CCD, or three CCD with spatial pixel offset imaging system and extracting a local region containing a current pixel of interest;

parameter calculation processing of setting a plurality of small regions in the extracted local region and calculating a parameter for region segmentation from each small region;

local region segmentation processing of segmenting the local region into uniform regions having single color correlation on the basis of calculated parameters;

selective regression processing of selecting color signals belonging to the same region as that of the current pixel of interest in the local region on the basis of the uniform region and regressing color correlation between the color signals to a linear formula; and selective restoring processing of selecting color signals belonging to the same region as that of the current pixel of interest in the local region on the basis of the uniform region and restoring a missing color signal in the same region as that of the current pixel of interest on the basis of the color signals and the linear formula.

According to the sixth aspect of the present invention, there is provided a computer-readable storage medium which stores a program comprising an instruction causing a computer to execute:

first restoring processing of restoring a missing color signal of an image signal obtained by imaging with a one CCD, two CCD, or three CCD with spatial pixel offset imaging system by linear interpolation;

conversion processing of converting the image signal restored by the first restoring processing into an original image signal obtained by the imaging system;

second restoring processing of restoring a missing color signal of the converted image signal on the basis of color correlation between color signals; and switching processing of switching between the conversion processing and the second restoring processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a table showing the correspondence between spectrum gradients and classes;

FIGS. 9A and 9B are views showing the filter layout in the second embodiment of the present invention;

DETAILED DESCRIPTION OF THE INVENTION

Embodiments of the present invention will be described below in detail with reference to the accompanying drawing.

The present applicant has proposed, in Japanese Patent Application No. 10-15325, a method of accurately restoring a missing color signal on the basis of the color correlation between color signals in a local region. In this method, when the object is uniform in a local region and has a single color correlation, an image quality equivalent to that of a three CCD imaging element can be obtained. However, when there are a plurality of objects and a plurality of color correlations, a false signal is generated. Although this prior art employs a method of verifying the reliability in units of local regions, the false signal cannot be completely prevented. Additionally, since a region with low reliability is switched to linear interpolation, giving priority to prevention of the false signal decreases the image quality improving effect. Furthermore, since the color correlation is calculated for each local region, high-speed processing is difficult.

Solutions to these problems will be described below in detail on the basis of specific embodiments.

First Embodiment

Figure 1:
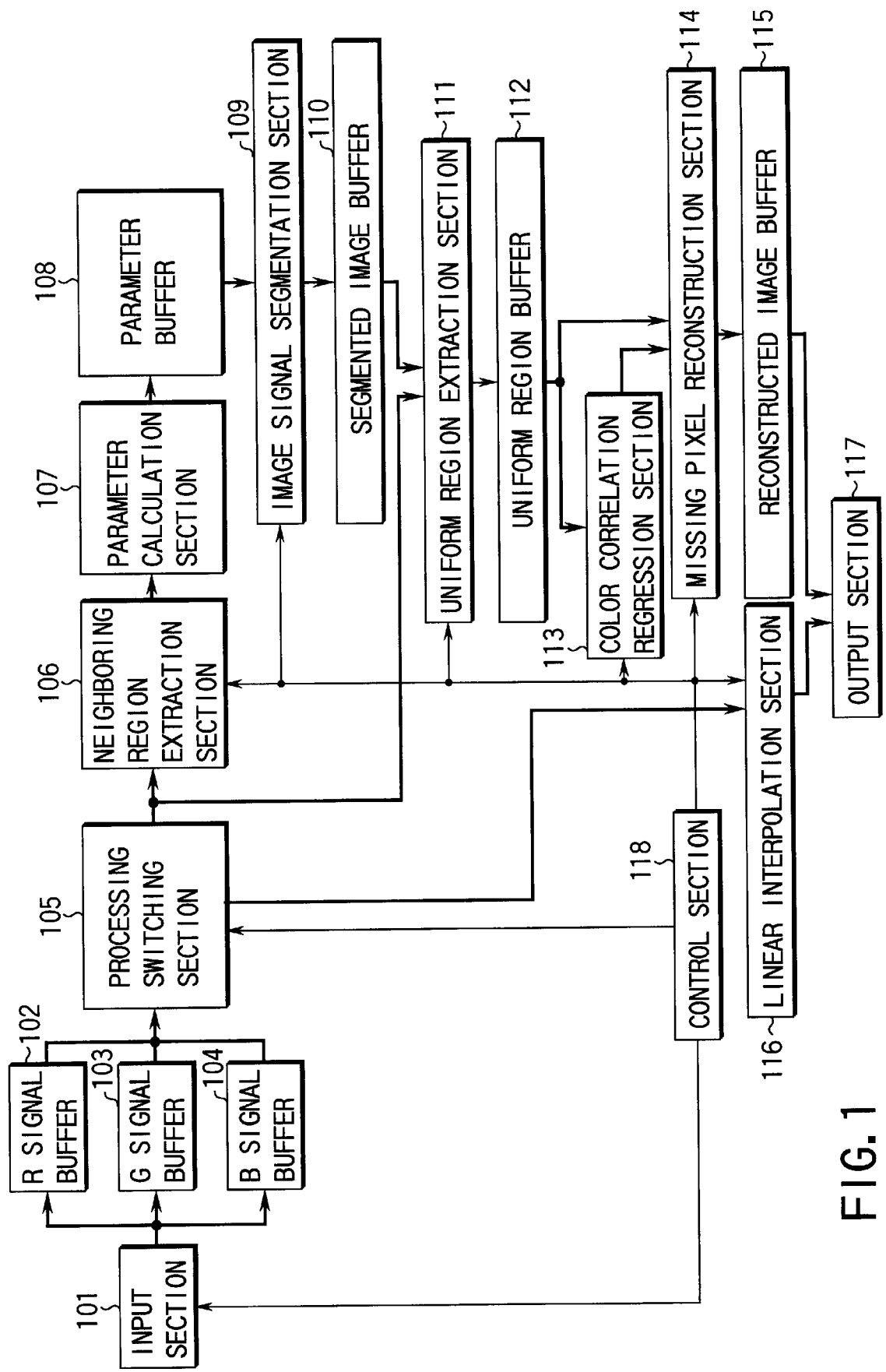
FIG. 1 is a block diagram showing the arrangement of the first embodiment of the present invention.
Figure 22:
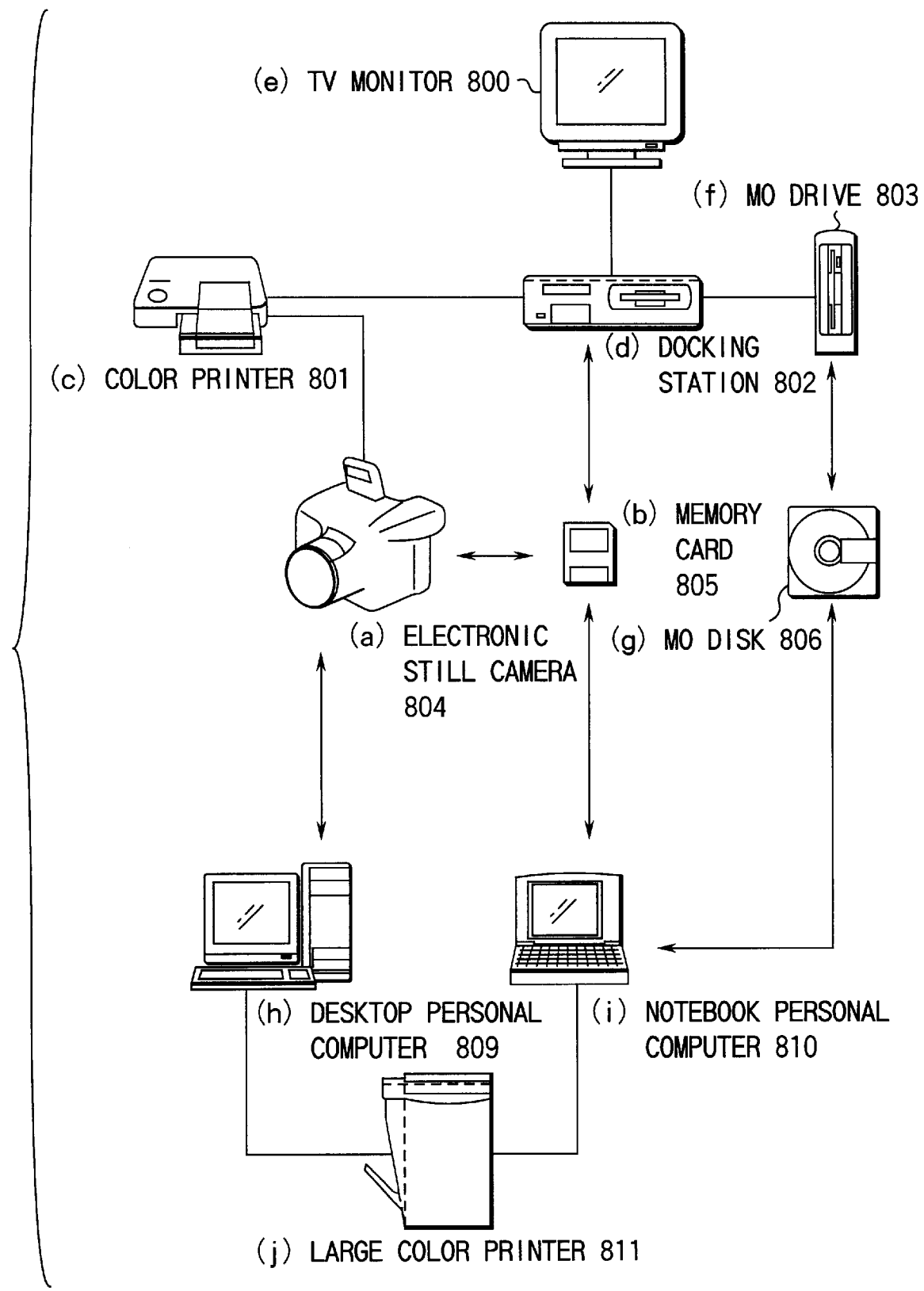
FIG. 22 is a view showing the arrangement of an electronic still camera system.

FIG. 1 is a block diagram showing the arrangement of the first embodiment of the present invention. The first embodiment assumes that the image processing apparatus of the present invention is constructed by an electronic still camera 804 of the electronic still camera system shown in FIG. 22, and a signal that has undergone image processing is output to a memory card 805 or color printer 801.

An input section 101 using a one CCD is connected to an R signal buffer 102, G signal buffer 103, and B signal buffer 104. The R signal buffer 102, G signal buffer 103, and B signal buffer 104 are connected to a neighboring region extraction section 106 and linear interpolation section 116 through a processing switching section 105. The neighboring region extraction section 106 is connected to a segmented image buffer 110 through a parameter calculation section 107, parameter buffer 108, and image signal segmentation section 109.

The segmented image buffer 110 and processing switching section 105 are connected to a uniform region extraction section 111. The uniform region extraction section 111 is connected to a color correlation regression section 113 and missing pixel reconstruction section 114 through a uniform region buffer 112. The color correlation regression section 113 is connected to the missing pixel reconstruction section 114. The missing pixel reconstruction section 114 is connected to an output section 117 such as a memory card or printer through a reconstructed image buffer 115. The linear interpolation section 116 is also connected to the output section 117.

A control section 118 such as a microcomputer is connected to the input section 101, processing switching section 105, neighboring region extraction section 106, image signal segmentation section 109, uniform region extraction section 111, color correlation regression section 113, missing pixel reconstruction section 114, and linear interpolation section 116.

The function of the above arrangement will be described along the flow of signals. R, G, and B signals from the input section 101 are transferred to the R signal buffer 102, G signal buffer 103, and B signal buffer 104, respectively, under the control of the control section 118. The color signals in the signal buffers 102, 103, and 104 are transferred to the neighboring region extraction section 106 or linear interpolation section 116 through the processing switching section 105 under the control of the control section 118. This selection can be done by a change-over switch (not shown). Alternatively, automatic switching may be employed to transfer the signals to the neighboring region extraction section 106 when digital zoom is used or to the linear interpolation section 116 when digital zoom is not used.

When the signals are transferred to the linear interpolation section 116, missing color signals are restored by known linear interpolation. The signals are transferred to the output section 117, and processing is ended. When the signals are transferred to the neighboring region extraction section 106, the signals are sequentially scanned in units of pixels, and at least one neighboring region having a predetermined size and containing the current pixel of interest is extracted. The extraction size is determined on the basis of the filter layout used in the input section 101, and the number of regions to be extracted is determined in consideration of the balance between the processing speed and the expected image quality improving effect. The parameter calculation section 107 obtains a spectrum gradient from color signals present in each neighboring region and classifies the spectrum gradients into classes on the basis of the signs of gradients to obtain a region segmentation parameter. When one neighboring region is extracted, the class of the neighboring region is used as the parameter of the current pixel of interest. When a plurality of neighboring regions are extracted, the class of the greatest number of is used as the parameter of the current pixel of interest. The parameter calculated by the parameter calculation section 107 is transferred to the parameter buffer 108 and stored. The control section 118 repeats this process until all pixels are scanned. When all pixels are scanned, classes corresponding to all pixels are stored in the parameter buffer 108 as parameters.

Next, the control section 118 transfers the parameters on the parameter buffer 108 to the image signal segmentation section 109. The image signal segmentation section 109 segments regions in units of classes by known smoothing and labeling and transfers the result to the segmented image buffer 110. When region segmentation is ended, the uniform region extraction section 111 sequentially loads R, G, and B signals corresponding to the individual regions from the processing switching section 105 on the basis of the region segmentation result on the segmented image buffer 110 and transfers the signals to the uniform region buffer 112 under the control of the control section 118.

The color correlation regression section 113 regresses the color correlation of each color signal on the uniform region buffer 112 to a linear formula and transfers the linear formula data to the missing pixel reconstruction section 114. The missing pixel reconstruction section 114 restores or reconstructs a missing color signal on the basis of the color signals on the uniform region buffer 112 and the linear formula data from the color correlation regression section 113, and transfers the signal to the reconstructed image buffer 115. The control section 118 repeats this process until all regions on the segmented image buffer 110 are processed. When all regions are processed, a complete image signal whose missing signals are restored is present on the reconstructed image buffer 115. This signal is output to the output section 117.

Figure 2:
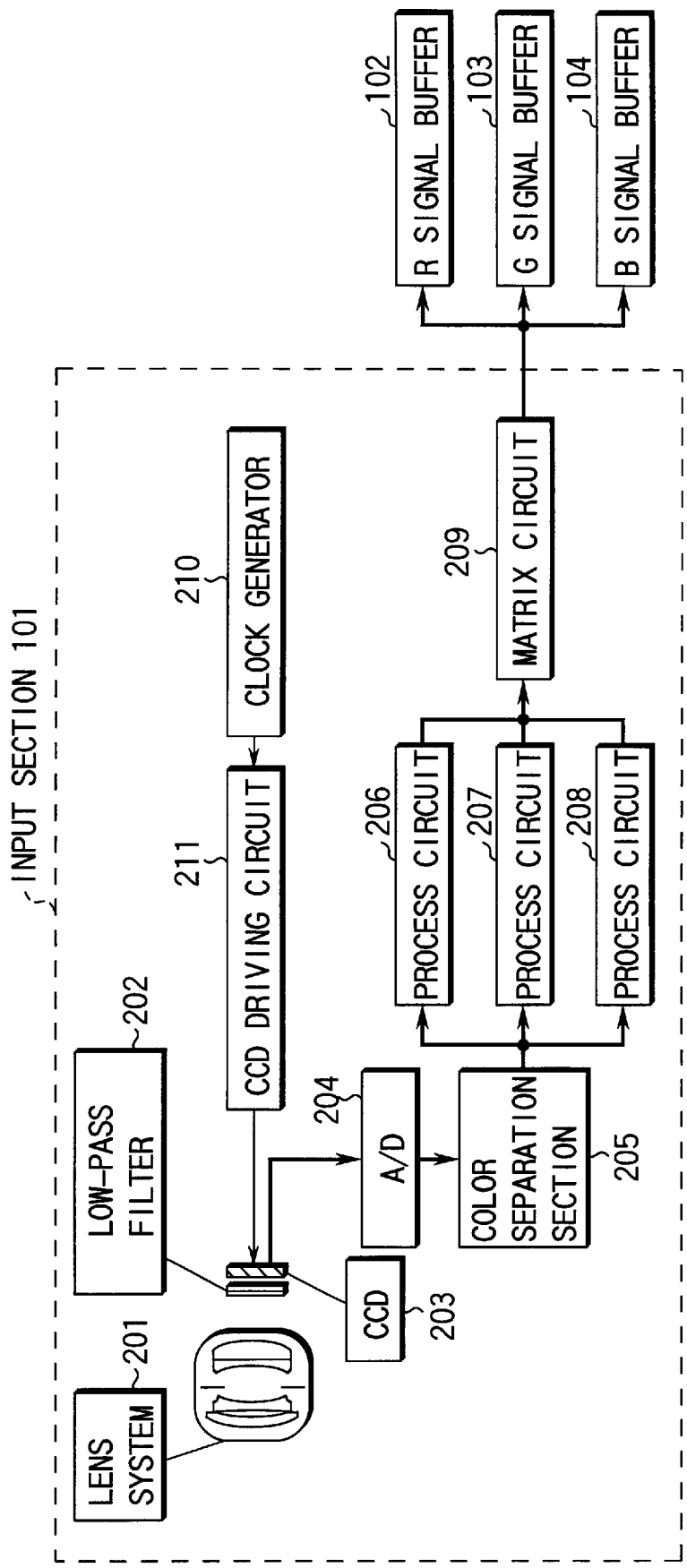
FIG. 2 is an explanatory view of a one CCD input section.

FIG. 2 is an explanatory view showing an example of a specific arrangement of the input section 101. A one CCD 203 is arranged via a lens system 201 and low-pass filter 202. The CCD 203 has, e.g., a filter layout of R, G, and B primary colors shown in FIG. 3B. An image signal obtained by the CCD 203 is converted into R, G, and B signals through an A/D converter 204, color separation section 205, process circuits 206, 207, and 208, and matrix circuit 209, and stored in the R signal buffer 102, G signal buffer 103, and B signal buffer 104, respectively. The CCD 203 is connected to a CCD driving circuit 211 operating on the basis of a clock generator 210.

Figure 3A:
FIGS. 3A to 3C are views showing the filter layout in the first embodiment of the present invention.
Figure 3B:
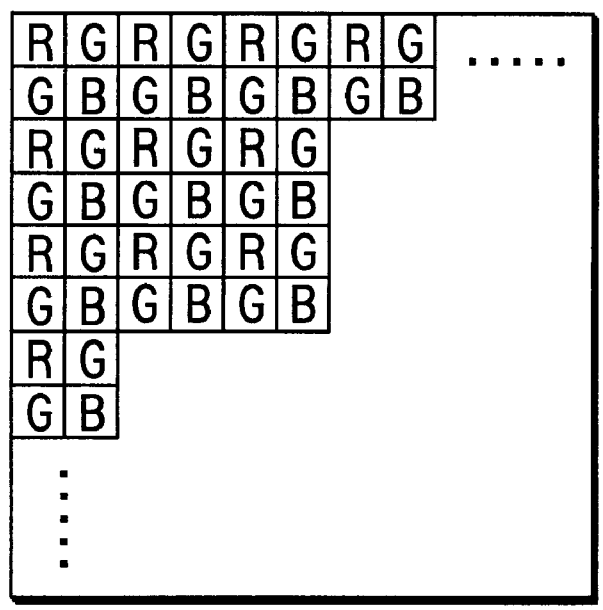
Figure 3C:
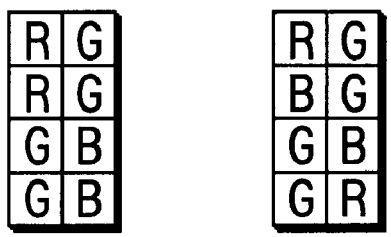

FIG. 3B is an explanatory view of a specific arrangement of the filter layout of the CCD 203 shown in FIG. 2. A 2×2 basic layout as shown in FIG. 3A is repeated to fill all pixels on the CCD (FIG. 3B). FIG. 3C is a view showing another basic layout having a size of 2×4.

Figure 4:
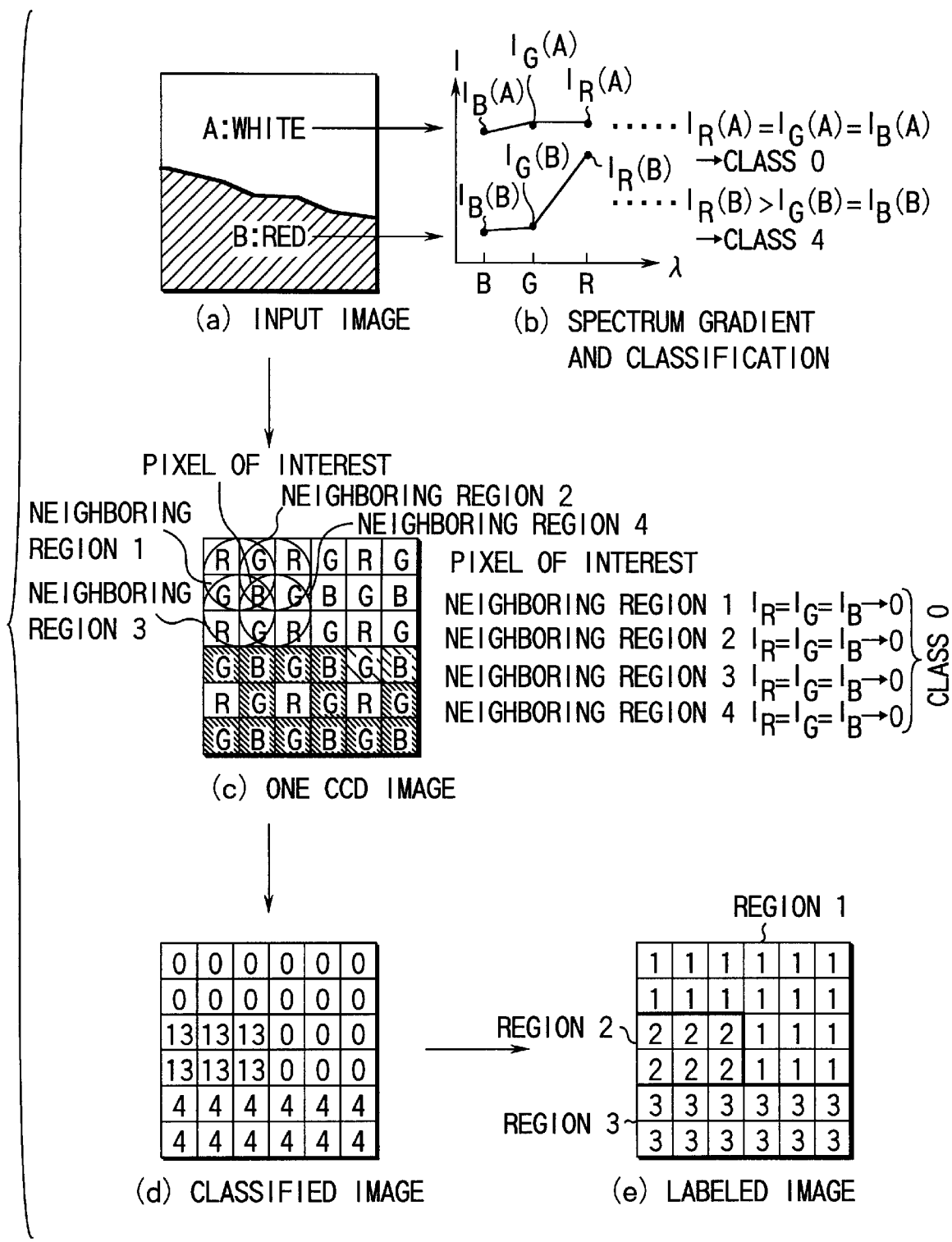
FIG. 4 is an explanatory view of region segmentation based on the spectrum gradient.

FIG. 4 is an explanatory view related to region segmentation based on the spectrum gradient obtained by the neighboring region extraction section 106 and parameter calculation section 107. The (a) of FIG. 4 shows an example of an input image in which an upper region A is white and a lower region B is red. In (b) of FIG. 4, intensities (I) for three wavelength (λ) of R, G, and B are plotted in the regions A and B. The region A is white, and the gradient of the spectrum intensities for the three wavelength of R, G, and B is represented by $I_R(A)=I_G(A)=I_B(A)$, i.e., the intensities are almost equal. Such region is defined as class 0.

The region B is red, and the gradient of the spectrum intensities is represented by $I_R(B)>I_G(B)=I_B(B)$. The intensity of the R signal is high, and the intensities of the G and B signals are almost equal to each other and lower than the intensity of the R signal. Such region is defined as class 4. There are 13 gradient combinations of R, G, and B signals. FIG. 5 shows these combinations plus one unclassifiable class.

The (c) of FIG. 4 shows an image obtained by sensing the input image shown in (a) of FIG. 4 with a one CCD having the filter layout shown in FIG. 3B. To obtain the spectrum gradient, R, G, and B signals are necessary. For a given pixel of interest, a region equal in size to the basic layout of the filter is set as a neighboring region, and the spectrum gradient within this neighboring region is obtained. In this embodiment, a 2×2 neighboring region is set. As shown in (c) of FIG. 4, four neighboring regions containing the pixel of interest are available. In this embodiment, spectrum gradients are obtained in all of the four neighboring regions. When a plurality of identical color signals are contained in a neighboring region, they are added and averaged. Referring to (c) of FIG. 4, since $I_R(A)=I_G(A)=I_B(A)$ holds in the four neighboring regions, the pixel of interest is classified into class 0. If four neighboring regions have different classes, the pixel is classified into the class of the greatest number of regions. If no greatest number of regions is present, the pixel is classified into undetermined class 13.

The (d) of FIG. 4 shows a state wherein classes 0 to 13 are assigned to the pixels by the above-described method. The classified images are output to the segmented image buffer 110. Images are classified on the basis of the spectrum form. In a class, images have the same spectrum form, and their color correlation can also be approximated by the same relational expression. The image signal segmentation section 109 categorizes the regions in units of classes by smoothing and labeling the classified images. The (e) of FIG. 4 shows a state wherein the image is segmented into three regions. This result is transferred to the segmented image buffer 110.

Figure 6:
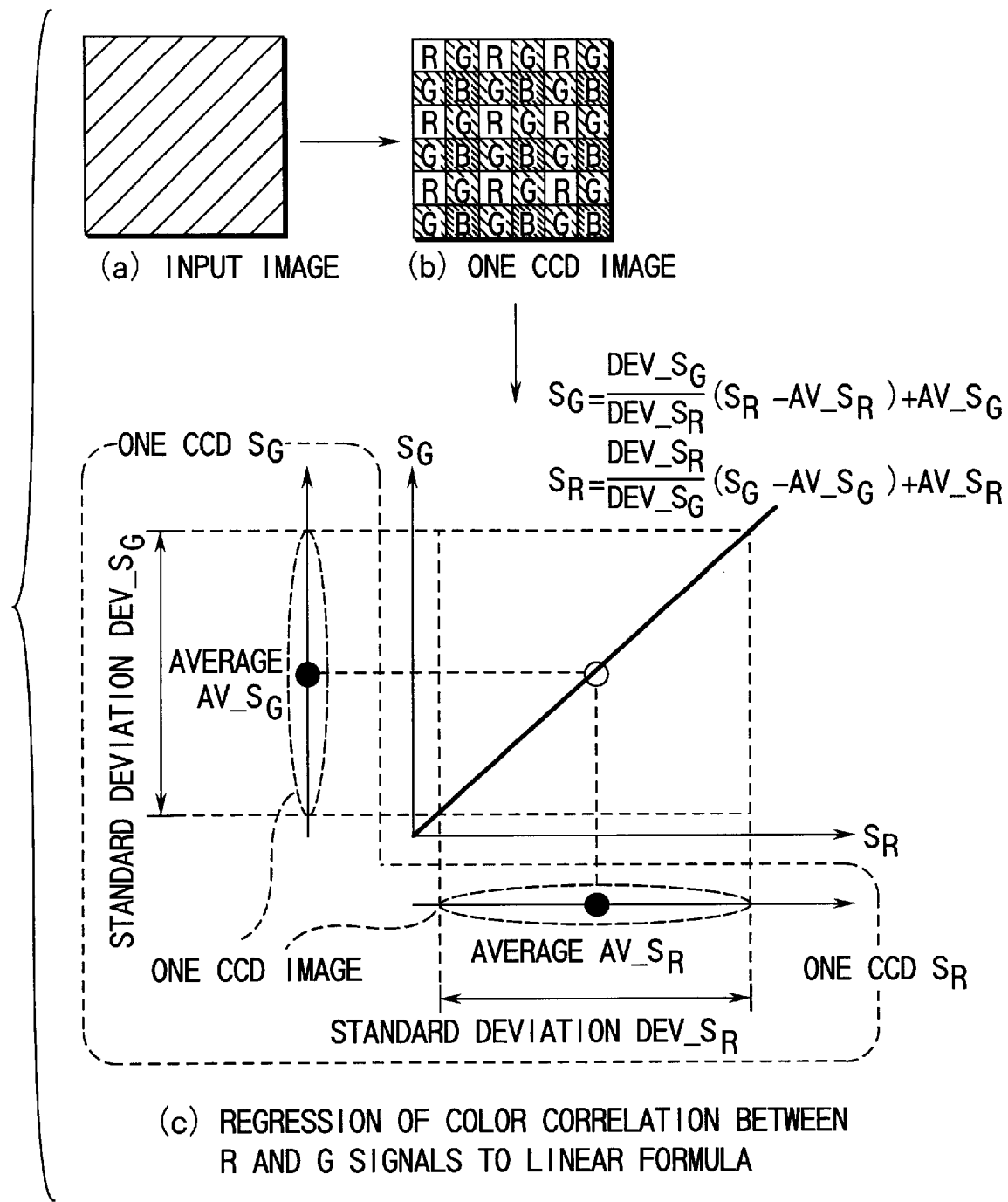
FIG. 6 is a view for explaining regression of color correlation to a linear formula.

FIG. 6 is a view for explaining regression of color correlation to a linear formula by the color correlation regression section 113. The (a) of FIG. 6 shows an example of an input image. The color correlation regression section 113 processes an image segmented into uniform regions in association with color correlation on the basis of the spectrum gradient obtained by the parameter calculation section 107. The (b) of FIG. 6 shows an image obtained by sensing the input image shown in (a) of FIG. 6 with a one CCD having the filter layout shown in FIG. 3B. The R, G, and B signals will be expressed by $S_i$ (i=R, G, B). The average of the $S_i$ signals is AV_$S_i$, and the standard deviation is DEV_$S_i$. When two color signals $S_i$ and $S_j$ (j=R, G, B, and j≠i) have linear color correlation therebetween, the linear formula is regressed by $$S_i = \frac{DEV\_S_i}{DEV\_S_j}(S_j - AV\_S_j) + AV\_S_i \quad (9)$$

The (c) of FIG. 6 shows regression of R-G signal color correlation to a linear formula. Regression to a linear formula is also done for the G-B and R-B signals. When the above linear formula is obtained, the G signal can be restored from a pixel containing the R signal. Conversely, the R signal can be restored from a pixel containing the G signal. Restoration is also possible between the R and B signals and between G and B signals. When this process is performed for all regions on the segmented image buffer 110, an image in which all color signals are reconstructed is obtained on the reconstructed image buffer 115.

In this embodiment, processing is performed on the hardware base. However, processing may be performed using software, as shown in FIG. 7.

Figure 7:
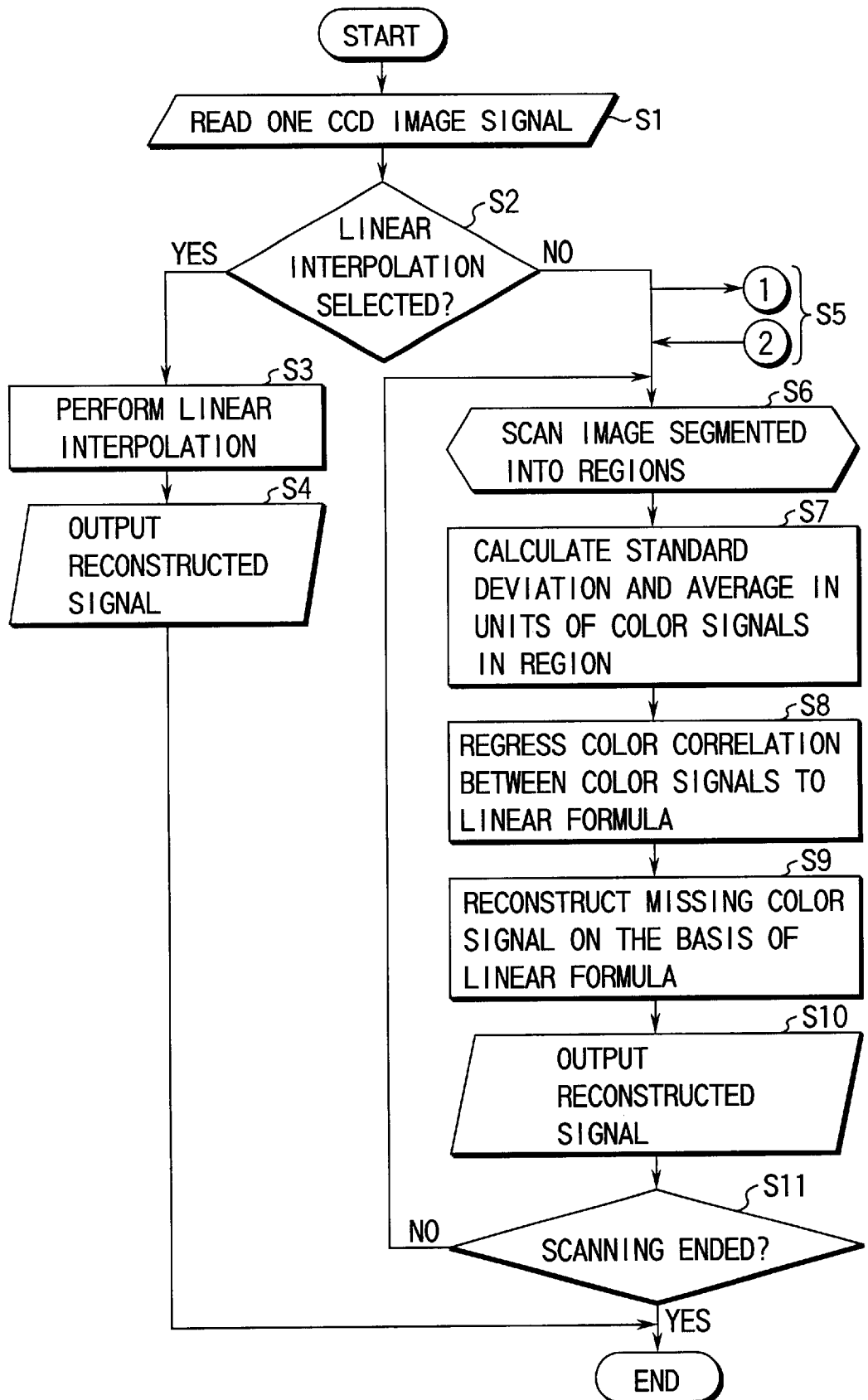
FIG. 7 is a flow chart (1) for explaining the function of the first embodiment of the present invention.

More specifically, in step S1 in FIG. 7, a one CCD image signal is read from the input section 101. In step S2, processing is selected by a change-over switch (not shown) or on the basis of the use/non-use of electronic zoom. For linear interpolation, the flow advances to step S3. Otherwise, the flow advances to step S5. In step S3, linear interpolation is performed to restore a missing color signal. In step S4, the restored color signal is output, and processing is ended.

In step S5, regions are segmented on the basis of the spectrum gradients. Details of processing in step S5 will be described later. In step S6, the region-segmented images are scanned to sequentially extract individual regions, and the next processing is performed. In step S7, the average AV_$S_i$ and standard deviation DEV_$S_i$ of each of the R, G, and B signals in a uniform region are calculated. In step S8, linear formulas between the R and G signals, G and B signals, and R and B signals are calculated on the basis of equation (9).

In step S9, a missing color signal in the region is restored on the basis of the linear formula. Next in step S10, the restored color signal is output. It is determined in step S11 whether all regions have been scanned. If YES in step S11, processing is ended. Otherwise, the flow returns to step S6.

Figure 8:
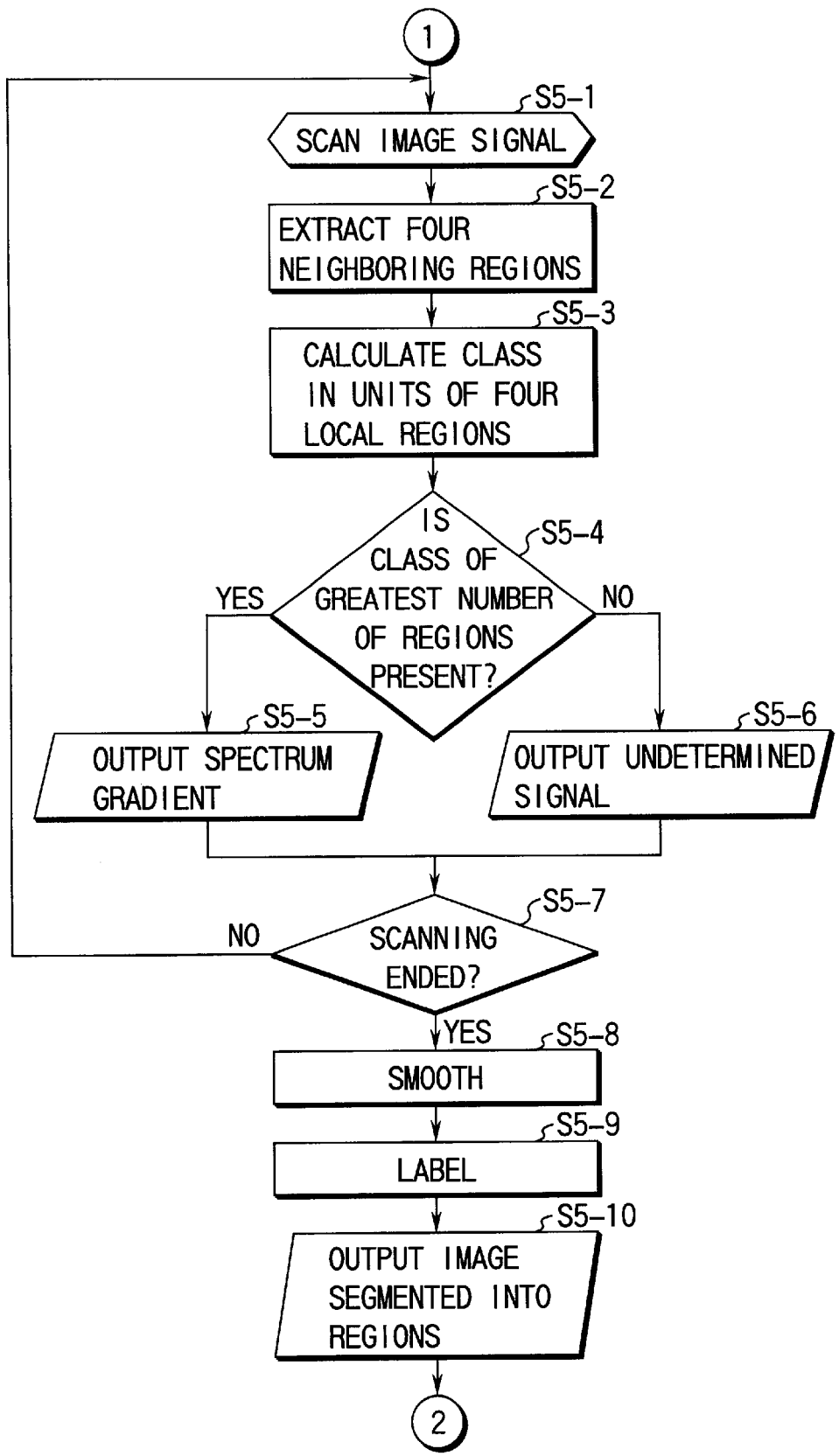
FIG. 8 is a flow chart (2) for explaining the function of the first embodiment of the present invention.

Region segmentation in step S5 is performed as shown in FIG. 8. In step S5-1, the image signal is scanned in units of pixels, and the next processing is performed. In step S5-2, four 2×2 neighboring regions containing the current pixel of interest are extracted. In step S5-3, classes are obtained from the spectrum gradients of the local regions on the basis of FIG. 5. It is determined in step S5-4 whether the class of the greatest number of regions is present. If YES in step S5-4, the flow advances to step S5-5. If NO in step S5-4, the flow advances to step S5-6. In step S5-5, the class of the greatest number of regions is output. In step S5-6, class 13 is output as an undetermined class.

It is determined in step S5-7 whether all pixels have been scanned. If YES in step S5-7, the flow advances to step S5-8. Otherwise, the flow returns to step S5-1.

In step S5-8, smoothing by a 3×3 median filter is performed. Next, regions are segmented by labeling in step S5-9. In step S5-10, the image segmented into regions is output.

When spectrum gradients are obtained from neighboring regions based on the filter layout, and the input image is segmented into regions, regions having single color correlation are obtained. For each of these regions, color correlation is regressed to a linear formula and calculated to restore a missing pixel. With this method, a high-frequency component can be restored, and an accurate reconstructed image can be obtained, unlike the conventional linear interpolation.

In addition, since an image is segmented into uniform regions in advance, any false signal can also be prevented. In the prior art, regression calculation must be performed a number of times in units of rectangular regions. In this embodiment, since regression calculation is necessary for only a larger region, the calculation time can be shortened. The spectrum gradient can be obtained on the basis of the relationship in magnitude between color signals. Hence, processing can be performed at a high speed and low cost. Furthermore, since restoration by linear interpolation with a normal image quality can be selected as needed, the processing speed can be further increased.

In this embodiment, the 2×2 filter layout is used, as shown in FIG. 3A. However, the filter layout is not limited to this and can be freely set. For example, the filter layout shown in FIG. 3C can also be used. In this case, the neighboring region extraction section 106 extracts a 2×4 region. The number of neighboring regions to be extracted is not limited to four. For example, one neighboring region may be extracted to shorten the calculation time. In this case, the parameter calculation section 107 need not obtain the class of the greatest number of regions, and the undetermined class is unnecessary. In this embodiment, compression processing is not illustrated. When data is to be stored in, e.g., a memory card, a known compression section such as a JPEG coder may be added to the input side of the output section 117.

Second Embodiment

The second embodiment of the present invention will be described below. The arrangement of the second embodiment is basically the same as that of the above-described first embodiment shown in FIGS. 1 and 2 except the function of a parameter calculation section 107.

The function of the second embodiment will be described below. The function is basically the same as that of the first embodiment, and only different parts will be described below. FIGS. 9A and 9B are explanatory views showing a specific example of a filter layout of a CCD 203 shown in FIG. 2. In this embodiment, a complementary color system filter of Cy, Mg, Ye, and G is used, unlike the first embodiment. As shown in FIG. 9A, a 2×4 basic layout is used. This basic pattern is repeated to fill all pixels on the CCD, as shown in FIG. 9B. A color separation section 205, process circuits 206, 207, and 208, and matrix circuit 209 shown in FIG. 2 are changed in accordance with the filter layout of the complementary color system. An R signal buffer 102, G signal buffer 103, and B signal buffer 104 shown in FIGS. 1 and 2 are replaced with four signal buffers for Cy, Mg, Ye, and G.

Figure 10:
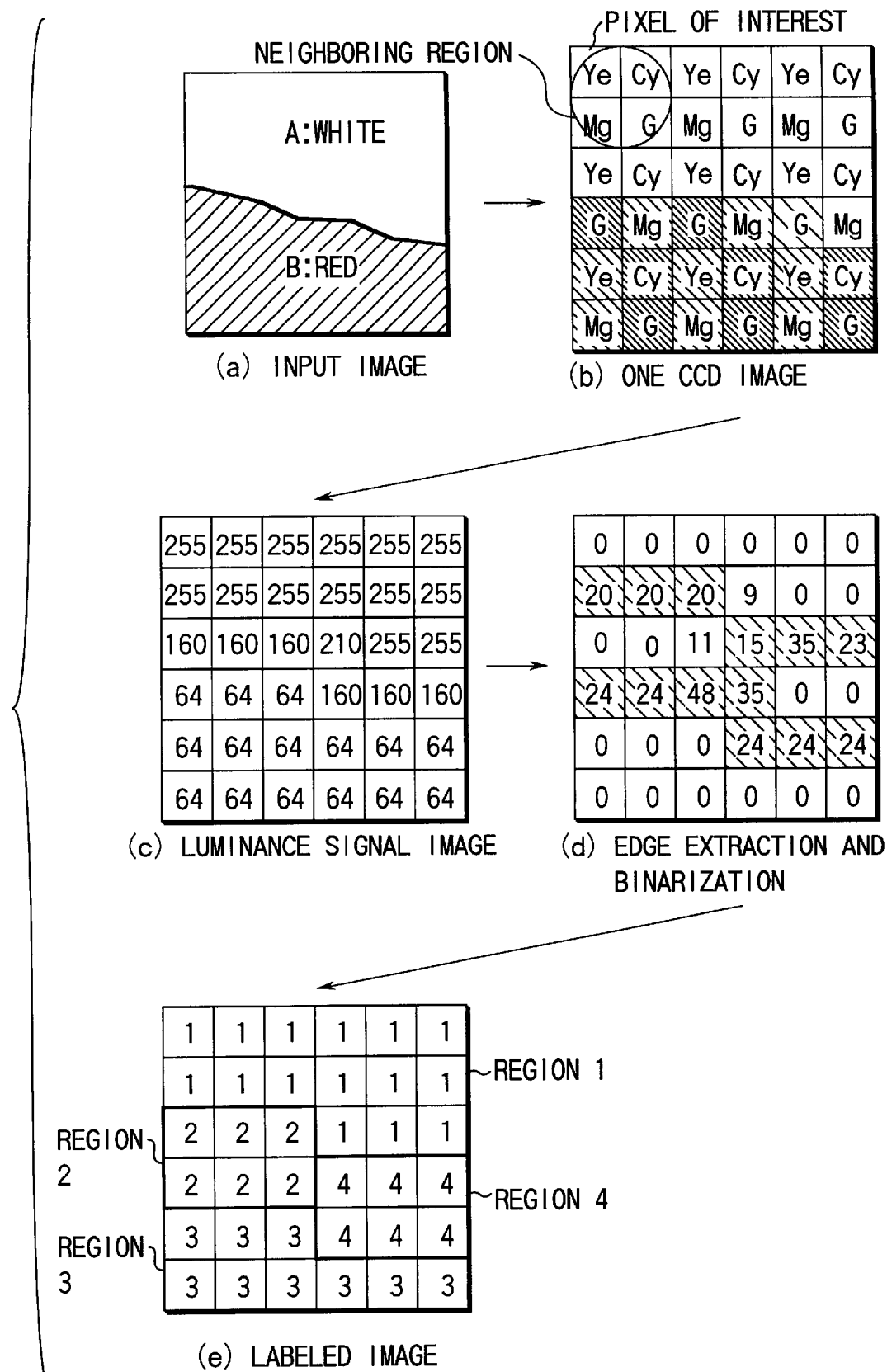
FIG. 10 is an explanatory view of region segmentation based on a luminance signal.

FIG. 10 is an explanatory view related to region segmentation based on a luminance signal by a neighboring region extraction section 106 and parameter calculation section 107. The (a) of FIG. 10 shows an example of an input image in which an upper region A is white and a lower region B is red. The (b) of FIG. 10 shows an image obtained by sensing the input image shown in (a) of FIG. 10 with a one CCD having the filter layout shown in FIG. 9B. To calculate a luminance signal from this one CCD image, signals of four colors of Cy, Mg, Ye, and G are necessary. For a given pixel of interest, a 2×2 neighboring region is set on the lower left side. With the filter layout shown in FIG. 9B, a 2×2 neighboring region set on the lower left side of a pixel always contains Cy, Mg, Ye, and G signals. A luminance signal Y is given by $$Y=Cy+Mg+Ye+G=2R+3G+2B \qquad (10)$$

The (c) of FIG. 10 shows luminance signals calculated in units of pixels on the basis of equation (10). The (d) of FIG. 10 shows edge intensities calculated by performing known edge extraction processing for the luminance signals. Hatched portions represent results obtained by binarizing the edge intensities using a predetermined threshold value, e.g., 15 in this embodiment. The (e) of FIG. 10 shows a region segmentation result obtained by known labeling based on the binarized pixels. In this embodiment, the image is segmented into four regions, and this result is transferred to a segmented image buffer 110. The subsequent processing is the same as in the first embodiment. The Cy, Mg, Ye, and G signals are restored in units of pixels and transferred to a reconstructed image buffer 115. After that, R, G, and B signals are calculated on the basis of the relationships represented by equations (4) to (6) and output to an output section 117.

Figure 11:
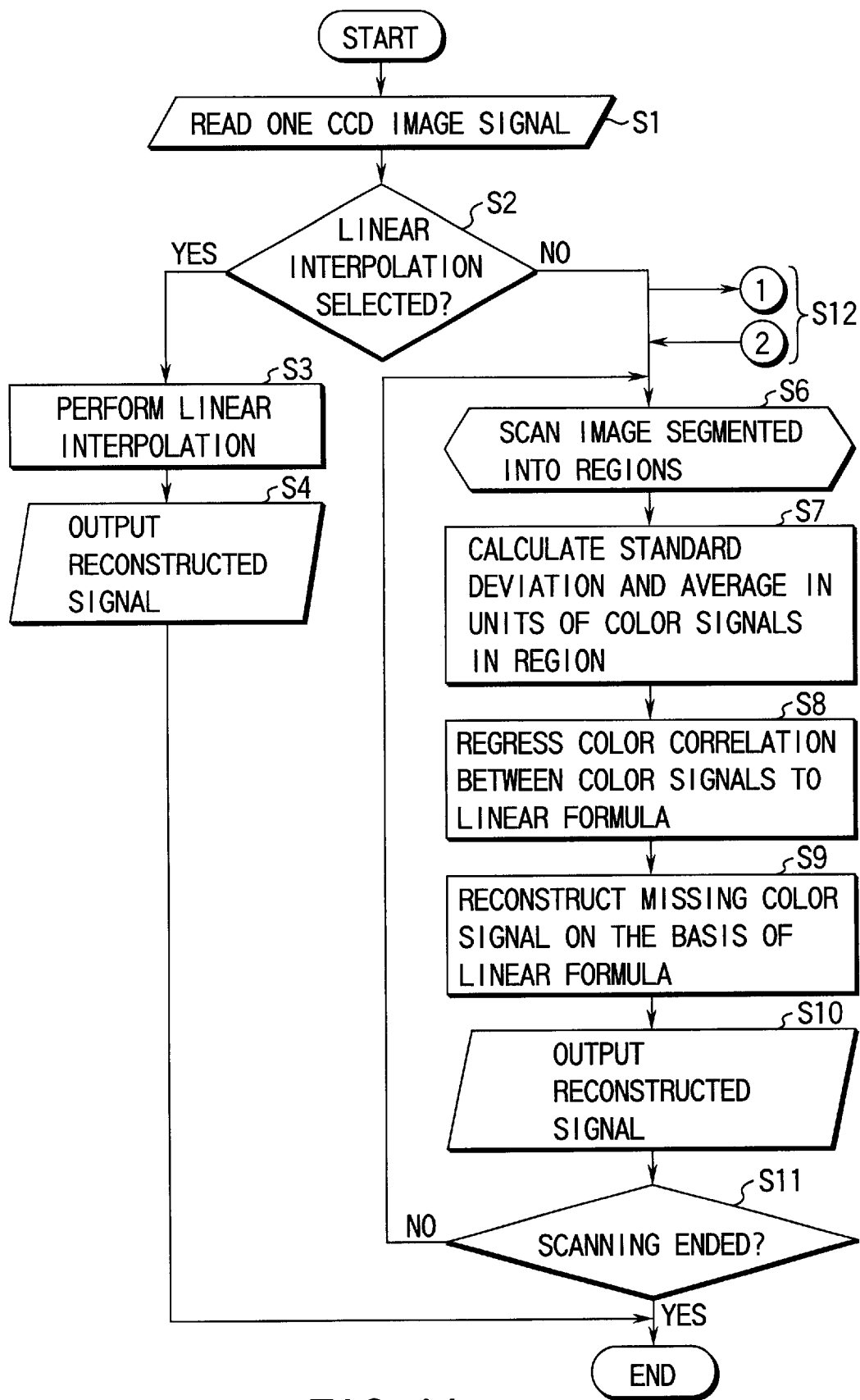
FIG. 11 is a flow chart (1) for explaining the function of the second embodiment of the present invention.
Figure 12:
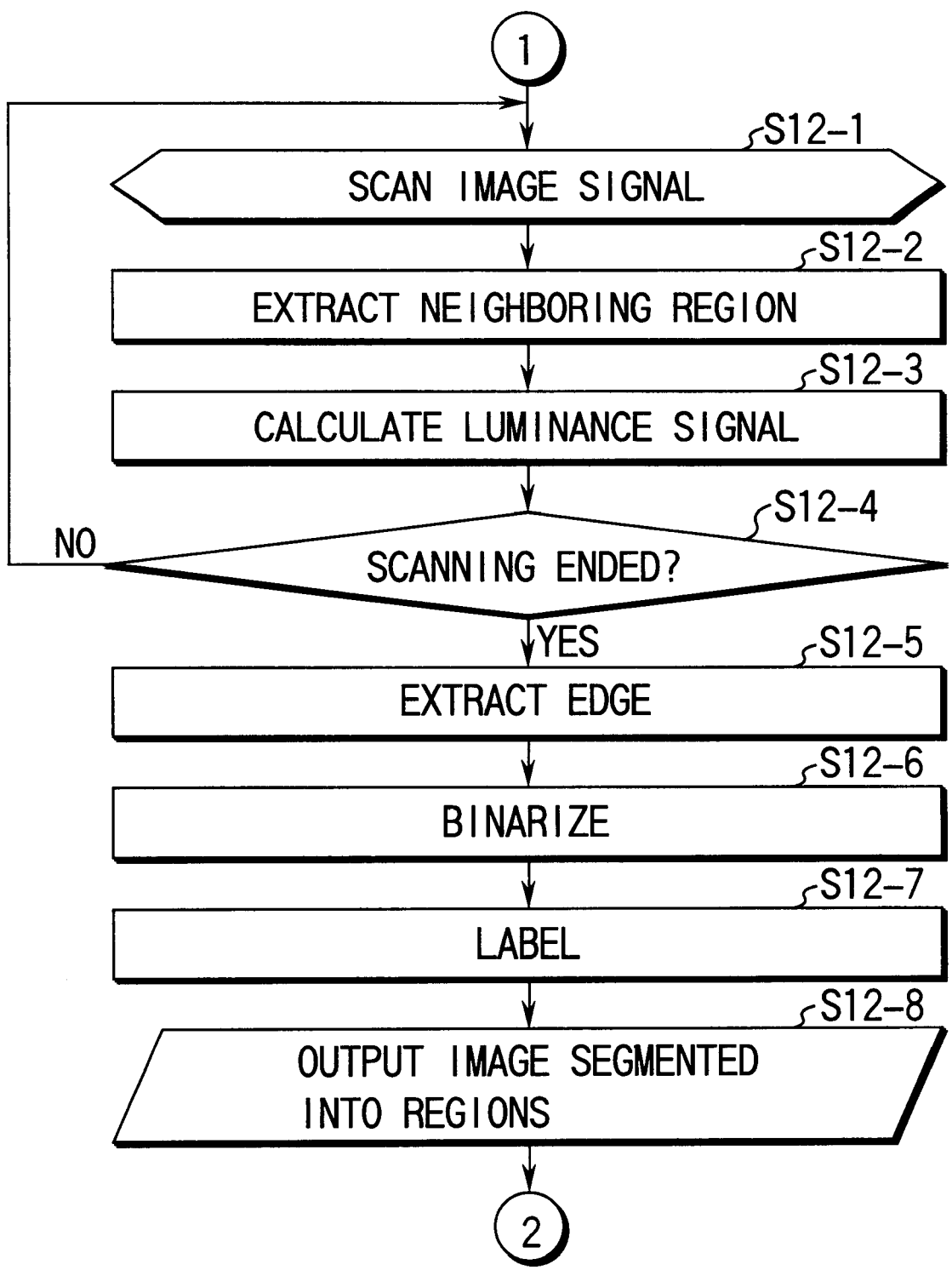
FIG. 12 is a flow chart (2) for explaining the function of the second embodiment of the present invention.

In this embodiment, processing is performed by hardware. However, processing may be performed by software, as shown in FIG. 11. The processing contents are the same as in the first embodiment shown in FIG. 7 except that step S5 is replaced with step S12. Region segmentation in step S12 is performed as shown in FIG. 12.

First, in step S12-1 the image signal is scanned in units of pixels, and the next processing is performed. In step S12-2, a 2×2 neighboring region containing the current pixel of interest is extracted. In step S12-3, a luminance signal is calculated on the basis of equation (10). It is determined in step S12-4 whether all pixels have been scanned. If YES in step S12-4, the flow advances to step S12-5. Otherwise, the flow returns to step S12-1. In step S12-5, edges are extracted. In step S12-6, binarization is performed. In step S12-7, labeling is performed to segment regions. In step S12-8, the image segmented into regions is output.

When the edge intensities of luminance signals are obtained from neighboring regions based on the filter layout, and the input image is segmented into regions, regions having single color correlation are obtained. For each of these regions, color correlation is regressed to a linear formula, and calculated to restore a missing pixel. With this method, a high-frequency component can be restored, and an accurate reconstructed image can be obtained, unlike the conventional linear interpolation.

In addition, since an image is segmented into uniform regions in advance, any false signal can also be prevented. In the prior art, regression calculation must be performed a number of times in units of rectangular regions. In this embodiment, since regression calculation is necessary for only a larger region, the calculation time can be shortened. The luminance signal can be calculated only by addition. Hence, processing can be performed at a high speed and low cost. Furthermore, since restoration by linear interpolation with a normal image quality can be selected as needed, the processing speed can be further increased.

Figure 13:
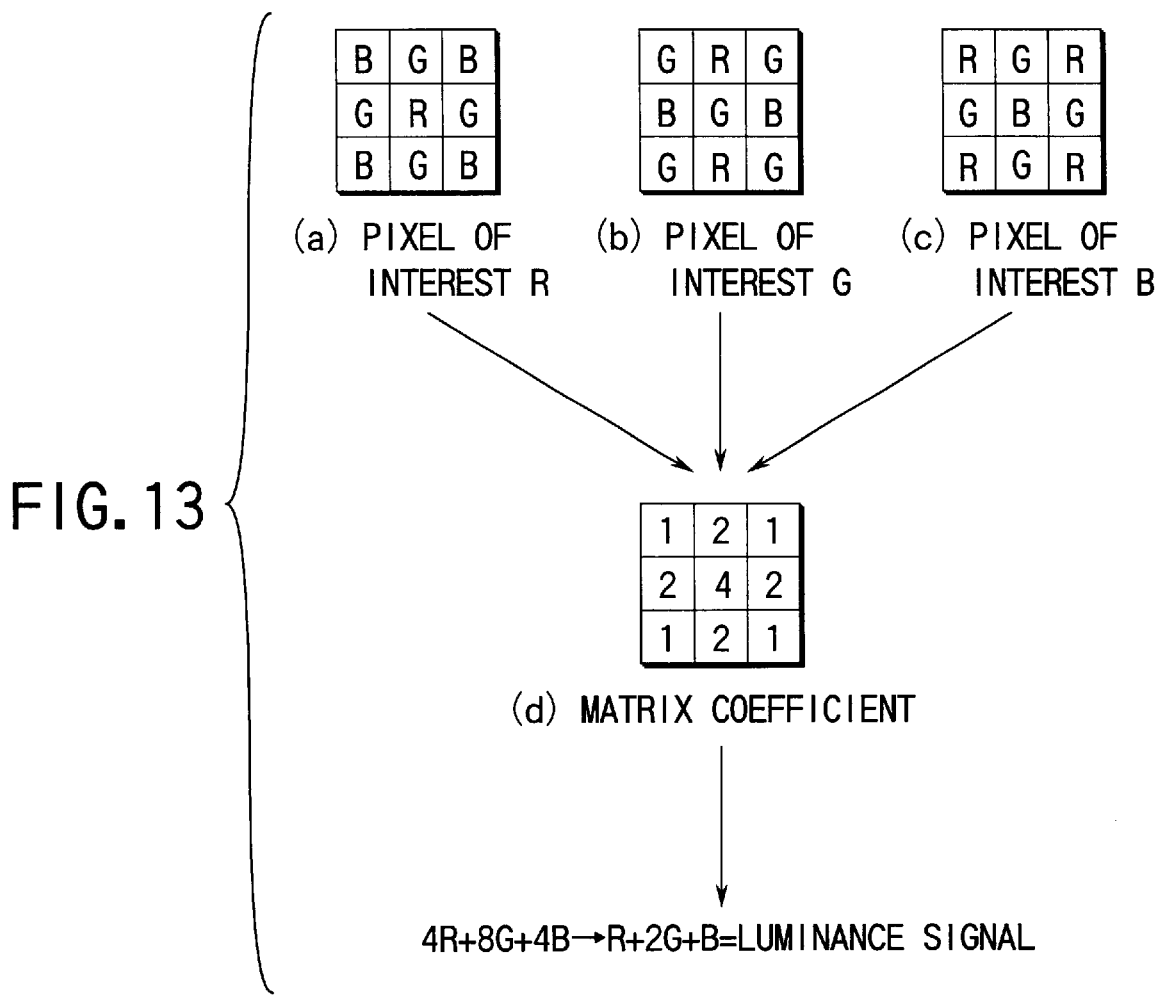
FIG. 13 is an explanatory view of luminance signal calculation of a primary color filter.

In this embodiment, a complementary color CCD is used. However, this embodiment can also be applied to a primary color CCD. The (a), (b), and (c) of FIG. 13 show a luminance signal calculation method using the filter layout shown in FIG. 3A. The (a), (b), and (c) of FIG. 13 show 3×3 neighboring region extraction portions corresponding to R, G, and B pixels of interest, respectively. Multiplication of the neighboring regions by a matrix coefficient shown in (d) of FIG. 13 yields 4R+8G+4B for all cases. This signal can be normalized and used as a luminance This embodiment can also be applied to a two CCD or three CCD with spatial pixel offset.

Third Embodiment

Figure 14:
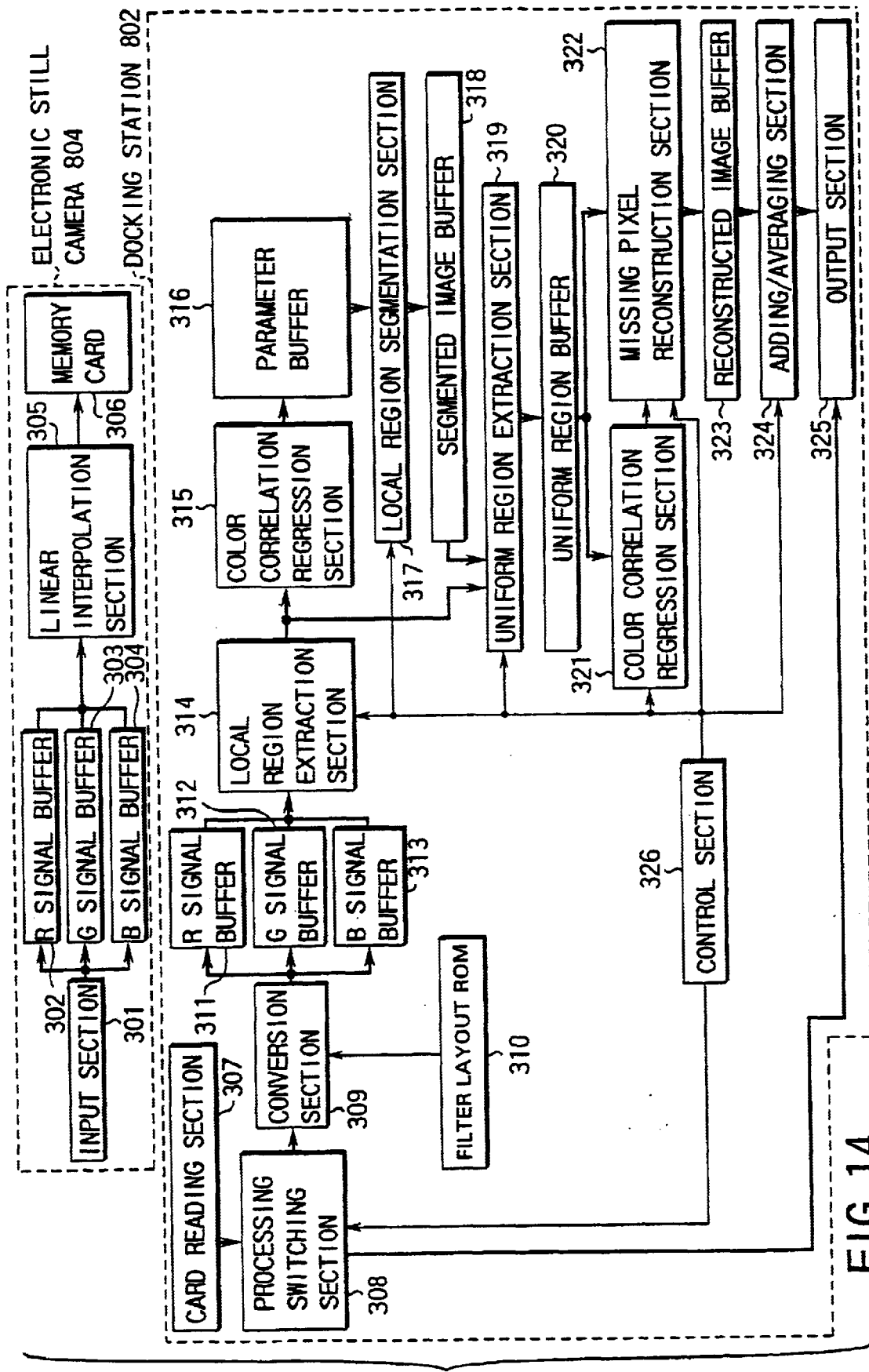
FIG. 14 is a block diagram showing the arrangement of the third embodiment of the present invention.

The third embodiment of the present invention will be described below. FIG. 14 is a block diagram showing the arrangement of the third embodiment of the present invention. In the third embodiment, the image processing apparatus of the present invention is constructed by an electronic still camera 804 and docking station 802 of an electronic still camera system shown in FIG. 22. These components are separated. An image signal obtained with the electronic still camera 804 is input to the docking station 802 through a memory card 805 and processed. The processed signal is output to a color printer 801, TV monitor 800, or MO drive 803 connected to the docking station 802.

Signals from an input section 301 using a two CCD in the electronic still camera 804 are transferred to R signal buffer 302, G signal buffer 303, and B signal buffer 304, and output to a memory card 306 through a linear interpolation section 305. A card reading section 307 in the docking station is connected to a processing switching section 308. The processing switching section 308 is connected to a conversion section 309 and output section 325. The conversion section 309 receives a signal from a filter layout ROM 310 and connects it to a R signal buffer 311, G signal buffer 312, and B signal buffer 313. Signals from the R signal buffer 311, G signal buffer 312, and B signal buffer 313 are sequentially transferred to a local region extraction section 314, color correlation regression section 315, parameter buffer 316, local region segmentation section 317, and segmented image buffer 318. Signals from the segmented image buffer 318 and local region extraction section 314 are transferred to a uniform region extraction section 319. A signal from the uniform region extraction section 319 is transferred to a color correlation regression section 321 and missing pixel reconstruction section 322. A signal from the color correlation regression section 321 is connected to the missing pixel reconstruction section 322. A signal from the missing pixel reconstruction section 322 is output to the output section 325 such as a printer or monitor through a reconstructed image buffer 323 and adding/averaging section 324. A control section 326 such as a microcomputer is connected to the processing switching section 308, local region extraction section 314, local region segmentation section 317, uniform region extraction section 319, color correlation regression section 321, missing pixel reconstruction section 322, and adding/averaging section 324.

The function of the third embodiment will be described below. R, G, and B signals from the input section 301 are transferred to the R signal buffer 302, G signal buffer 303, and B signal buffer 304, respectively. The linear interpolation section 305 reconstructs a missing color signal and outputs the image signal to the memory card 306. When the memory card 306 is inserted into the card reading section 307 in the docking station 802, the image signal on the memory card 306 is transferred to the processing switching section 308. The processing switching section 308 transfers the image signal to the conversion section 309 or output section 325 on the basis of the control of the control section 326. This selection can be done by a change-over switch (not shown). The number of pixels of the image signal is compared with that of the output medium. When the number of pixels of the output medium such as a color printer is larger, the image signal can be transferred to the conversion section 309. When the number of pixels of the output medium such as a TV monitor is smaller, the image signal can be automatically transferred to the output section 325 without any processing.

When the image signal is transferred to the conversion section 309, the conversion section 309 loads from the filter layout ROM 310 the filter layout used in the imaging system. On the basis of the filter layout information, the conversion section 309 converts the image signal on the memory card 306 into the original state obtained by the imaging system and transfers the signal components to the R signal buffer 311, G signal buffer 312, and B signal buffer 313. The local region extraction section 314 sequentially scans the converted image signal in units of pixels and extracts a local region having a predetermined size, e.g., 6×6 and containing the current pixel of interest. The color correlation regression section 315 calculates the constant term of color correlation in the local region in accordance with equation (9) of the first embodiment. The constant term corresponds to $(DEV\_S_i/DEV\_S_j)\ AV\_S_j + AV\_S_i$ obtained by rearranging equation (9) into equation (11)

$$S_i = \frac{DEV\_S_i}{DEV\_S_j} S_j - \frac{DEV\_S_i}{DEV\_S_j} AV\_S_j + AV\_S_i \qquad (11)$$

Since this constant term has a value close to 0 in a region having single color correlation, region segmentation can be performed on the basis of this value. The color correlation regression section 315 sets small 2×2 regions in the local region and sequentially scans the small regions. Constant terms are calculated for three combinations of R-G, G-B, and R-B signals in units of small regions. The maximum value of the three constant terms is transferred to the parameter buffer 316. The control section 326 repeats the above process until scanning in the local region is ended. When scanning is ended, constant terms corresponding to the pixels in the local region are stored in the parameter buffer 316 as parameters.

Next, the control section 326 transfers each parameter on the parameter buffer 316 to the local region segmentation section 317. The local region segmentation section 317 binarizes the parameter using a predetermined threshold value. Regions having single color correlation are classified into 0, and other boundary regions are classified into 1. Region segmentation is performed by known labeling, and the result is transferred to the segmented image buffer 318. After region segmentation is ended, the uniform region extraction section 319 receives, from the local region extraction section 314, R, G, and B signals belonging to the same region as that of the current pixel of interest on the basis of the region segmentation result on the segmented image buffer 318, and transfers the signals to an uniform region buffer 320 under the control of the control section 326. The color correlation regression section 321 regresses the color correlation of each color signal on the uniform region buffer 320 to a linear formula and transfers the linear formula data to the missing pixel reconstruction section 322. This embodiment assumes a two CCD, and therefore, a G signal has no missing pixel. To restore missing color signals of R and B signals, color correlations are regressed to linear formulas between two combinations of R-G and G-B signals. The missing pixel reconstruction section 322 restores a missing color signal on the basis of each color signal on the uniform region buffer 320 and the linear formula data from the color correlation regression section 321, and transfers the signal to the reconstructed image buffer 323. The local region as the base of restoration is set by scanning the converted image signal in units of pixels. For this reason, duplication occurs in accordance with the size of the local region, and the restored color signal is also duplicated. In this embodiment, the signals are integrated and stored in the reconstructed image buffer 323. The control section 326 repeats the above process until image signal scanning by the local region extraction section 314 is ended. When all pixels are scanned, the adding/averaging section 324 averages the integrated image signals on the reconstructed image buffer 323 in accordance with the number of times of integration and outputs the signal to the output section 325.

Figure 15:
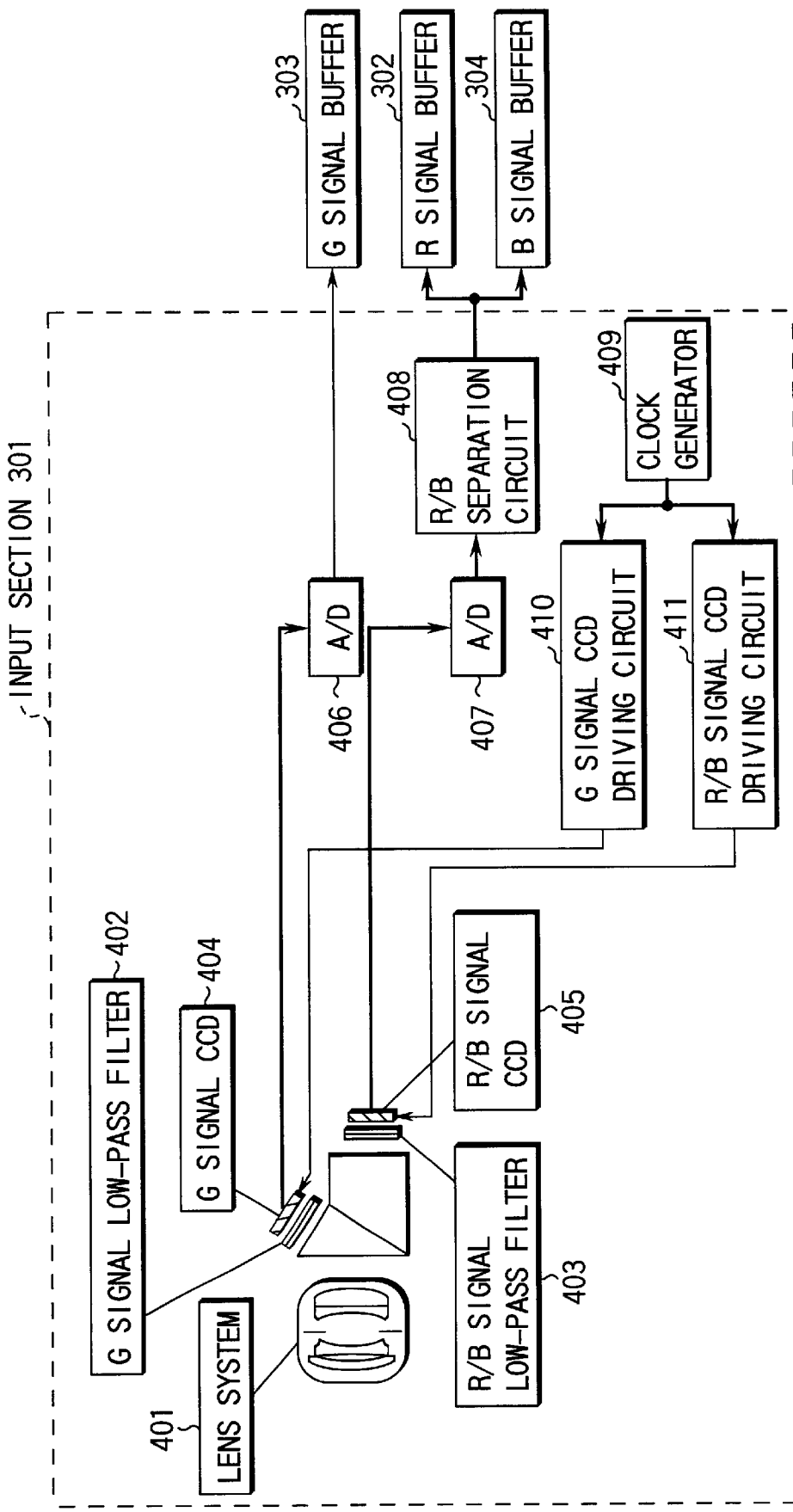
FIG. 15 is an explanatory view of a two CCD input section.

FIG. 15 is an explanatory view showing a specific example of the input section 301. A G signal low-pass filter 402 and G signal CCD 404, and an R/B signal low-pass filter 403 and R/B signal CCD 405 are arranged via a lens system 401. G filters are applied to all pixels of the G signal CCD 404. R and B filters are applied to the pixels of the R/B signal CCD 405 in a checkerboard pattern. An electrical signal from the G signal CCD 404 is stored in the G signal buffer 303 through an A/D converter 406. A signal from the R/B signal CCD 405 is transferred to the R signal buffer 302 and B signal buffer 304 through an A/D converter 407 and R/B separation circuit 408. The G signal CCD 404 and R/B signal CCD 405 are connected to a G signal CCD driving circuit 410 and R/B signal CCD driving circuit 411, respectively, which operate on the basis of a clock generator 409.

Figure 16:
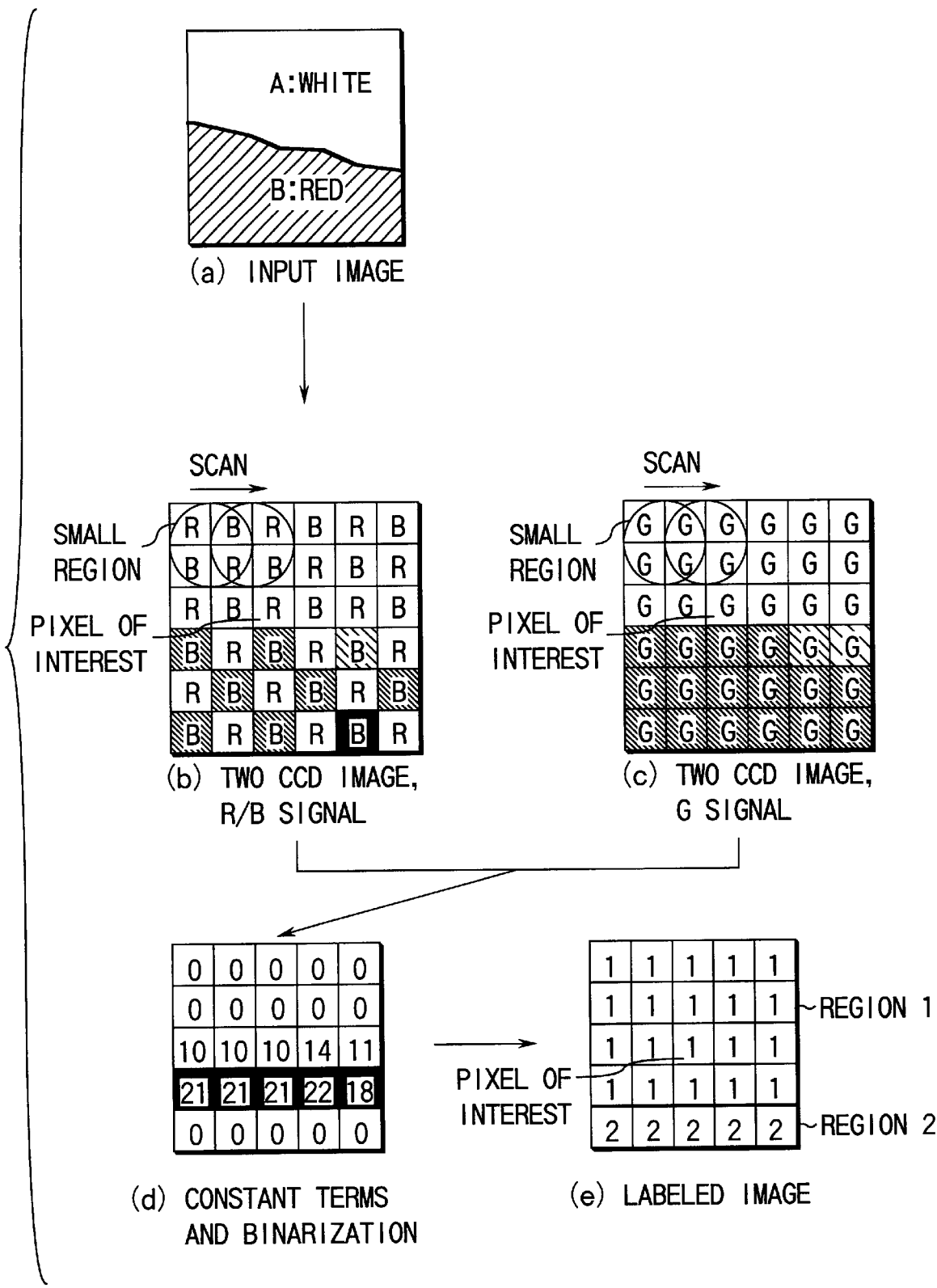
FIG. 16 is an explanatory view of region segmentation based on constant terms.

FIG. 16 is an explanatory view related to region segmentation based on constant terms obtained by the local region extraction section 314 and color correlation regression section 315. The (a) of FIG. 16 shows an example of an input image in which an upper region A is white and a lower region B is red. The (b) and (c) of FIG. 16 show the image of a local region obtained by sensing the input image shown in (a) of FIG. 16 with the two CCD shown in FIG. 15. The local region has a size of, e.g., 6×6. To calculate the constant term of color correlation between color signals in this local region, R, G, and B signals are necessary. The color correlation regression section 315 sets a small region having a size of 2×2 and scans the local region from the origin at the upper left corner, as shown in (b) and (c) of FIG. 16. A small region with a size of 2×2 always contains R, G, and B signals. In this small region, the constant terms of color correlations of three signal combinations are calculated in units of small regions on the basis of equation (11), and the maximum value of each combination is selected.

The (d) of FIG. 16 shows the selected constant terms. Since the small region has a size of 2×2, constant terms corresponding to a 5×5 region are obtained at this time. Hatched portions represent results obtained by binarizing the constant terms using a predetermined threshold value, e.g., 15 in this embodiment. The (e) of FIG. 16 shows a region segmentation result obtained by known labeling based on the binarized pixels. In this embodiment, the pixel of interest belongs to label 1, so the uniform region extraction section 319 extracts pixels belonging to label 1.

Figure 17:
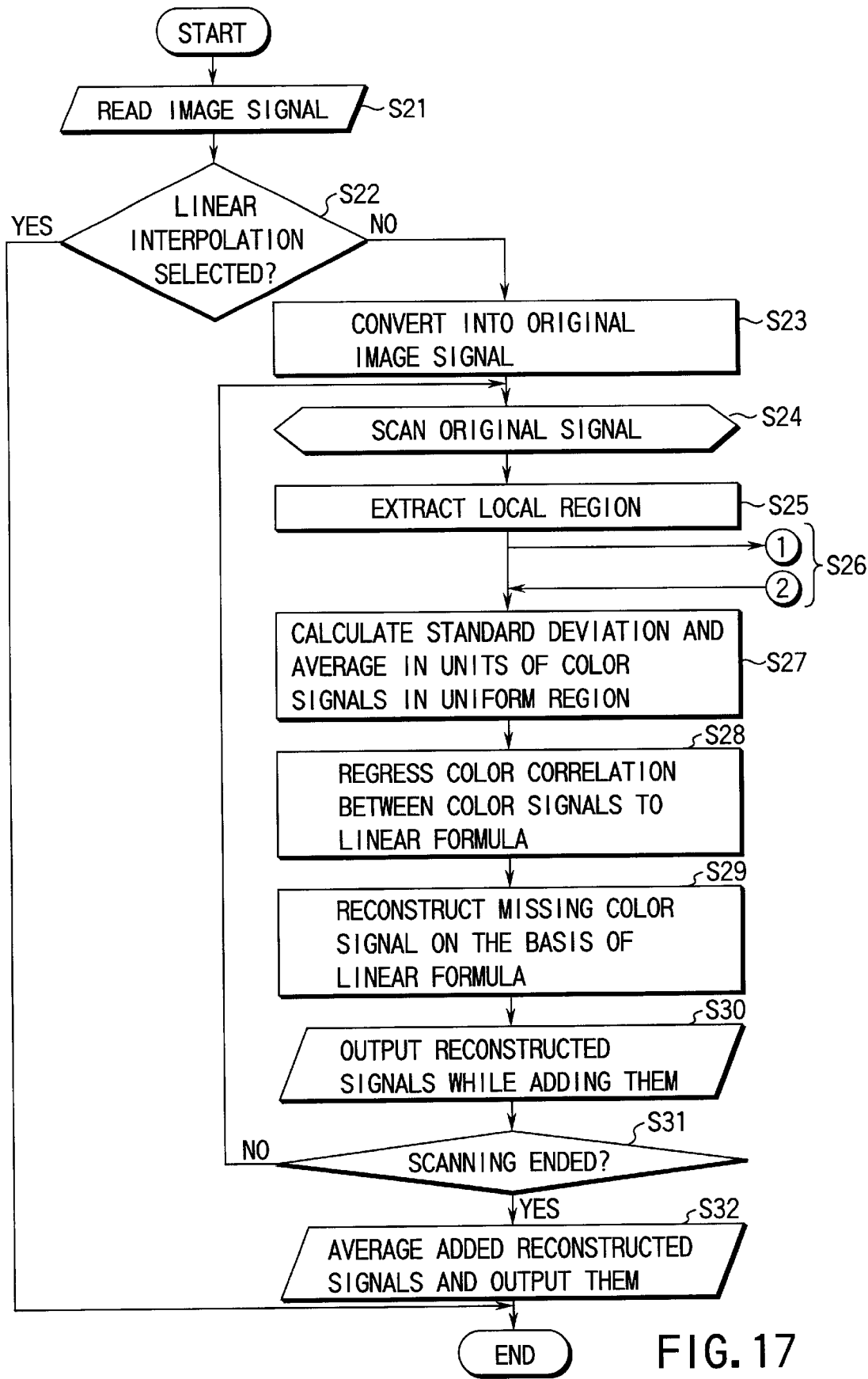
FIG. 17 is a flow chart (1) for explaining the function of the third embodiment of the present invention.

In this embodiment, processing is performed by hardware. However, processing may be performed by software, as shown in FIG. 17.

More specifically, an image signal is read from the input section 301 in step S21. In step S22, processing is selected by a change-over switch (not shown) or on the basis of the use/non-use of electronic zoom. When linear interpolation is selected, processing is ended. Otherwise, the flow advances to step S23. In step S23, the image signal is converted into an original image signal obtained by the imaging system. In step S24, the original image signal is scanned in units of pixels, and the next processing is performed. In step S25, a 6×6 local region containing the current pixel of interest is extracted. In step S26, the local region is segmented on the basis of the constant terms of color correlations. Details of processing in step S26 will be described later.

In step S27, the average $AV\_S_i$ and standard deviation $DEV\_S_i$ of each of R, G, and B signals in the same region as that of the current pixel of interest are calculated. In step S28, the R-G and G-B linear formulas are calculated on the basis of equation (9).

In step S29, a missing color signal in the region is restored or reconstructed on the basis of the linear formulas. In step S30, restored color signals are integrated and output. It is determined in step S31 whether all regions have been scanned. If YES in step S31, the flow advances to step S32. Otherwise, the flow returns to step S24. In step S32, the integrated color signals are averaged and output.

Figure 18:
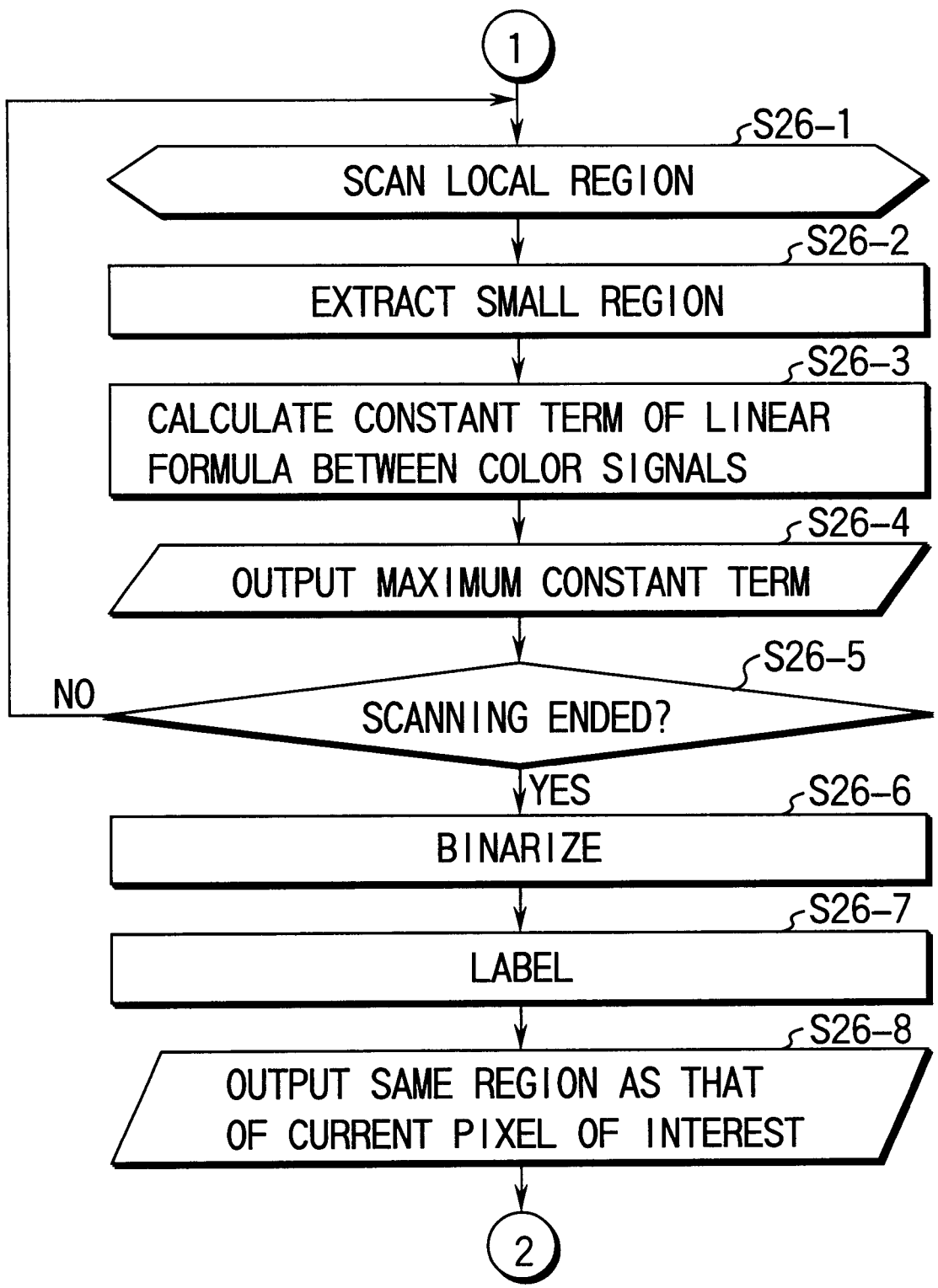
FIG. 18 is a flow chart (2) for explaining the function of the third embodiment of the present invention.

Local region segmentation in step S26 is performed as shown in FIG. 18.

First, in step S26-1 the local region is scanned in units of pixels, and the next processing is performed. In step S26-2, a small region having a size of 2×2 is extracted. In step S26-3, the constant terms of R-G, G-B, and R-B combinations are calculated on the basis of equation (11). In step S26-4, the constant term of the maximum value is output. It is determined in step S26-5 whether scanning of the local region is ended. If YES in step S26-5, the flow advances to step S26-6. Otherwise, the flow returns to step S26-1. In step S26-6, the obtained constant terms are binarized. In step S26-7, the region is segmented by labeling. In step S26-8, the same region as that of the current pixel of interest is output.

As described above, in this embodiment, an image signal obtained by restoring a missing color signal by normal linear interpolation is converted into an original image signal obtained by the imaging system on the basis of the filter layout of the imaging system. After this, constant terms for regression of color correlations in a local region having a predetermined size are obtained, and the region is segmented to obtain regions having single color correlation. For each region, color correlation is regressed to a linear formula and calculated to restore a missing pixel. With this method, a high-frequency component can be restored, and an accurate reconstructed image can be obtained, unlike the conventional linear interpolation. In addition, since an image is segmented into uniform regions in advance, any false signal can also be prevented.

Processing in this embodiment can be performed separately from the electronic still camera and therefore can generally be applied to a conventional electronic still camera. Since processing is performed in units of local regions, the memory capacity to be used is small, and the processing can be realized at low cost. In addition, since processing can be omitted as needed, wasteful processing need not be performed.

In this embodiment, the local region is segmented using constant terms. However, the present invention is not limited to this. The spectrum gradient in the first embodiment or the edge intensity of a luminance signal in the second embodiment can also be used. Conversely, segmentation using constant terms in this embodiment may be applied to the first and second embodiments. In this embodiment, processing is performed using a two CCD. However, this embodiment can be applied to a one CCD or three CCD with spatial pixel offset. When software is used, processing need not be performed in a dedicated docking station and can be realized on a general desktop or notebook personal computer. In this embodiment, the maximum effect can be obtained for an uncompressed image signal, as described above. Although the improving effect becomes small, this embodiment can be applied to a compressed image signal. In this case, a compression section is inserted between the linear interpolation section 305 and the memory card 306 in FIG. 14, and an expansion section is inserted between the card reading section 307 and the processing switching section 308.

Fourth Embodiment

The fourth embodiment of the present invention will be described below. The arrangement of the fourth embodiment is basically the same as that of the above-described third embodiment shown in FIGS. 14 and 15 except the function of a color correlation regression section 315.

Figure 19:
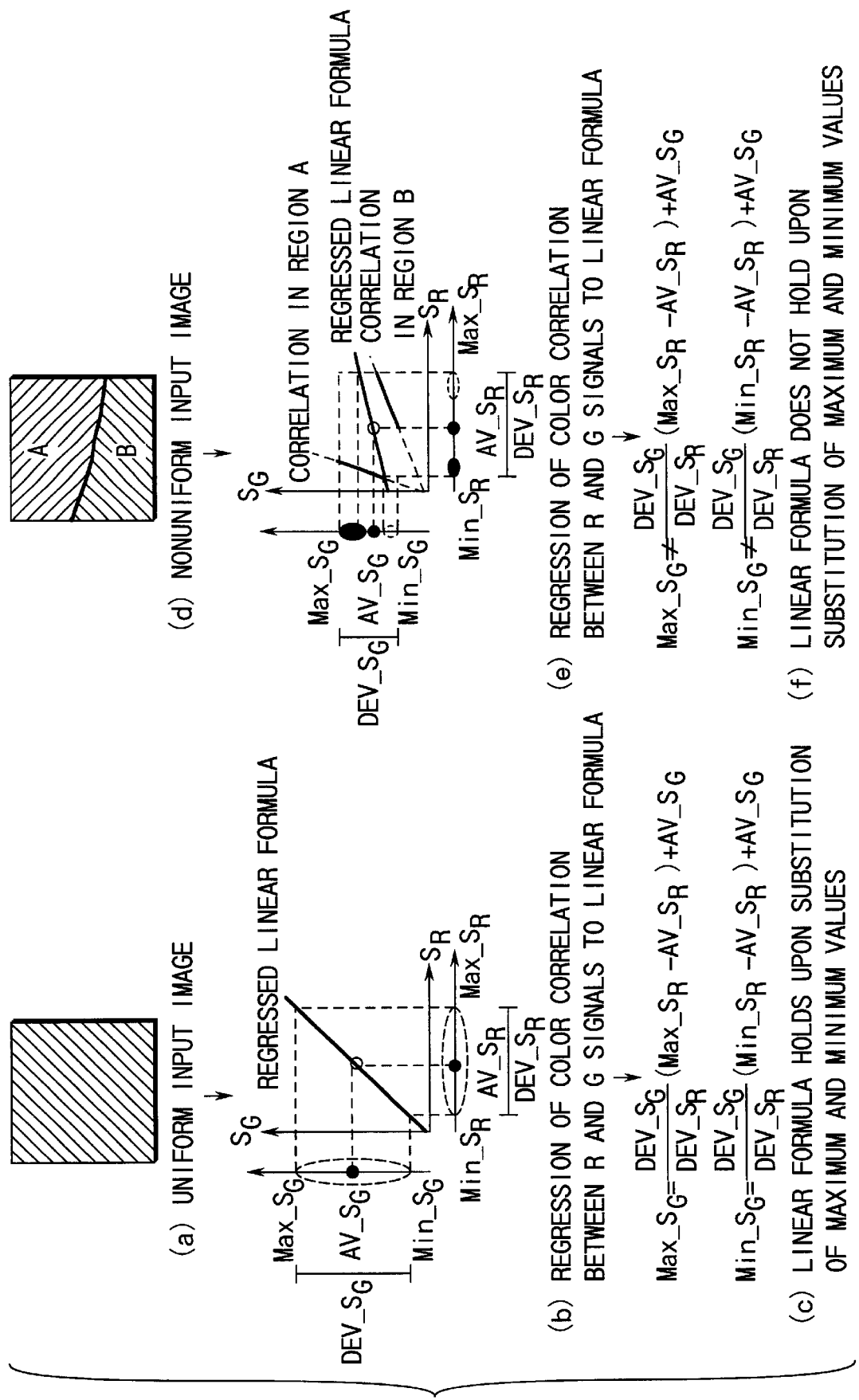
FIG. 19 is an explanatory view of verification of a linear formula using maximum and minimum values.

The function of the fourth embodiment will be described below. The function is basically the same as that of the third embodiment, and only different parts will be described below. FIG. 19 is an explanatory view related to region segmentation based on errors in the linear formula by maximum and minimum values obtained by a local region extraction section 314 and color correlation regression section 315. The (a) FIG. 19 shows an example of an input image that has a uniform region. The (b) of FIG. 19 shows a process of regressing color correlation between R and G signals from average $AV\_S_i$ and standard deviation $DEV\_S_i$ to a linear formula on the basis of equation (9). The maximum value in each signal will be represented by $Max\_S_i$, and the minimum value by $Min\_S_i$. When the maximum value or minimum value is substituted into the linear formula represented by equation (9), the equation holds in a uniform region like in this embodiment as per $$Max\_S_i \approx \frac{DEV\_S_i}{DEV\_S_j}(Max\_S_j - AV\_S_j) + AV\_S_i \quad (12)$$

$$Min\_S_i \approx \frac{DEV\_S_i}{DEV\_S_j}(Min\_S_j - AV\_S_j) + AV\_S_i$$

When the errors in the left- and right-hand sides are represented by Err_max and Err_min, we have $$Err\_max = Max\_S_i - \left\{\frac{DEV\_S_i}{DEV\_S_j}(Max\_S_j - AV\_S_j) + AV\_S_i\right\} \approx 0 \quad (13)$$

$$Err\_min = Min\_S_i - \left\{\frac{DEV\_S_i}{DEV\_S_j}(Min\_S_j - AV\_S_j) + AV\_S_i\right\} \approx 0$$

The (d) of FIG. 19 shows a nonuniform region in which an upper region A is white and a lower region B is red. The (e) of FIG. 19 is a view showing the linear formula of color correlation between the R and G signals in the entire region, and the linear formula of color correlation of each of the regions A and B, which are obtained on the basis of equation (9). The linear formula regressed in the entire region is influenced by the characteristics of each of the regions A and B and does not represent accurate color correlation. When the maximum value or minimum value is substituted into this linear formula, the equation does not hold.

$$Max\_S_i \neq \frac{DEV\_S_i}{DEV\_S_j}(Max\_S_j - AV\_S_j) + AV\_S_i \quad (14)$$

-continued
$$Min\_S_i \neq \frac{DEV\_S_i}{DEV\_S_j}(Min\_S_j - AV\_S_j) + AV\_S_i$$

Hence, region segmentation using the errors Err_max and Err_min is possible.

The color correlation regression section 315 sets small regions having a size of, e.g., 3×3 in the local region extracted by the local region extraction section 314 and sequentially scans the small regions. The size of the small region is adjusted on the basis of the filter layout of the imaging system to be used. The two errors are calculated for three combinations of R-G, G-B, and R-B signals in units of small regions. The maximum value of the errors is transferred to a parameter buffer 316. A control section 326 repeats this process until scanning in the local region is ended. Subsequently, as in the third embodiment, the parameters on the parameter buffer 316 are transferred to a local region segmentation section 317. The local region segmentation section 317 binarizes the parameters using a predetermined threshold value. Regions where single color correlation holds are classified into 0, and other boundary regions are classified into 1. Region segmentation is performed by known labeling, and the result is transferred to a segmented image buffer 318.

Figure 20:
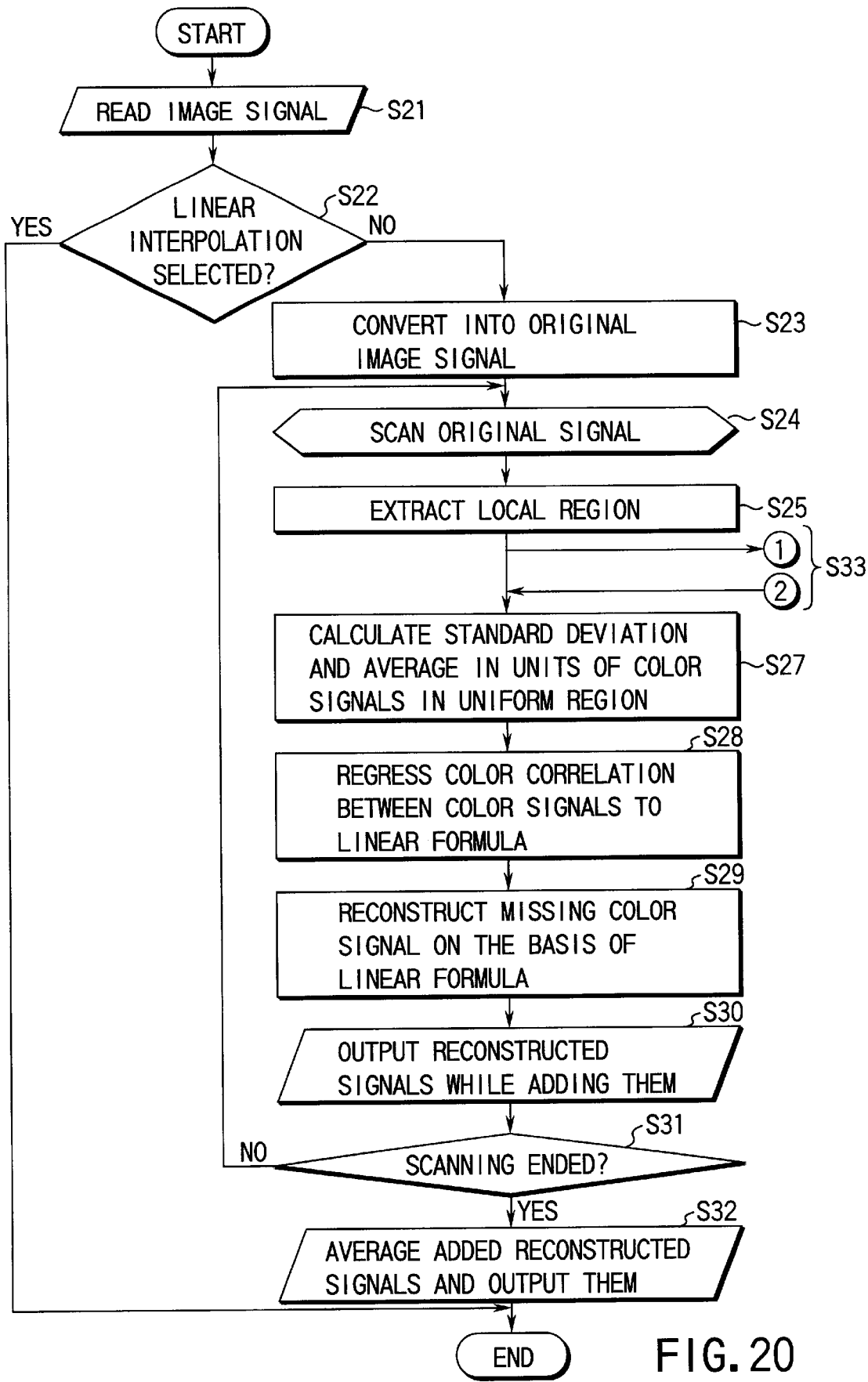
FIG. 20 is a flow chart (1) for explaining the function of the fourth embodiment of the present invention.

In this embodiment, processing is performed by hardware. However, processing may be performed by software, as shown in FIG. 20. The processing contents are the same as in the third embodiment shown in FIG. 17 except that step S26 is replaced with step S33.

Figure 21:
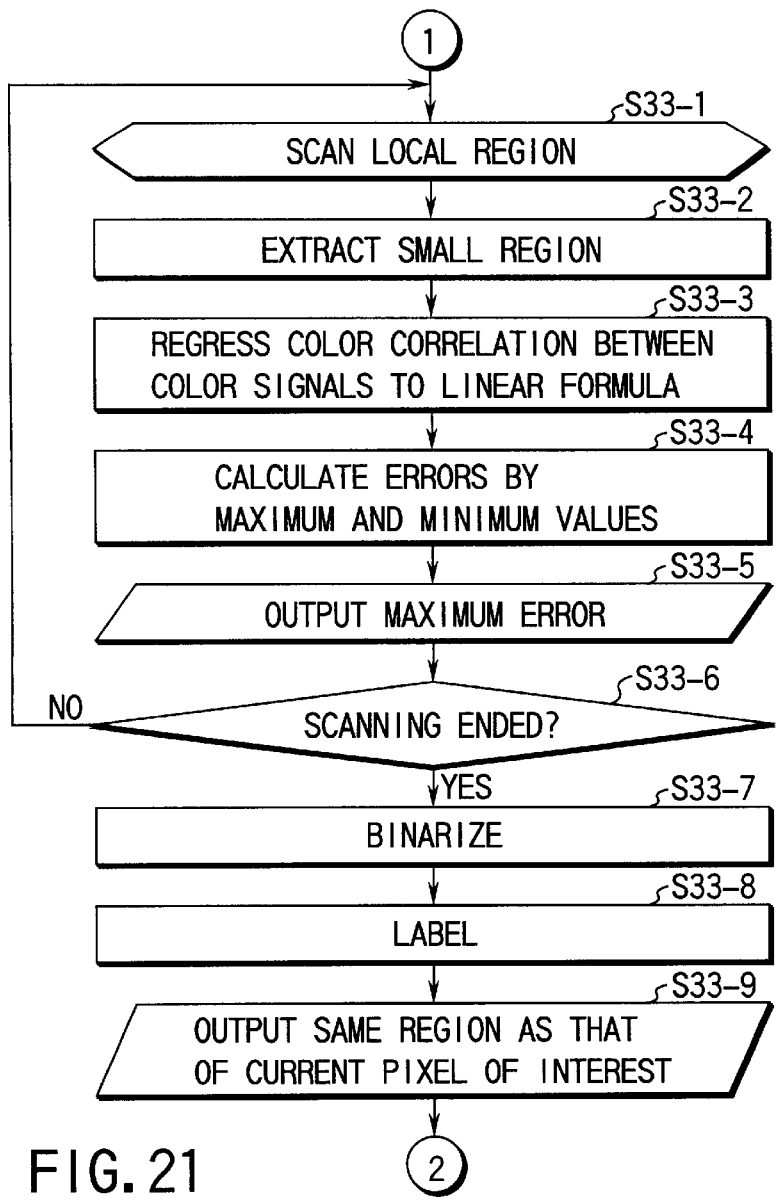
FIG. 21 is a flow chart (2) for explaining the function of the fourth embodiment of the present invention.
Figure 23:
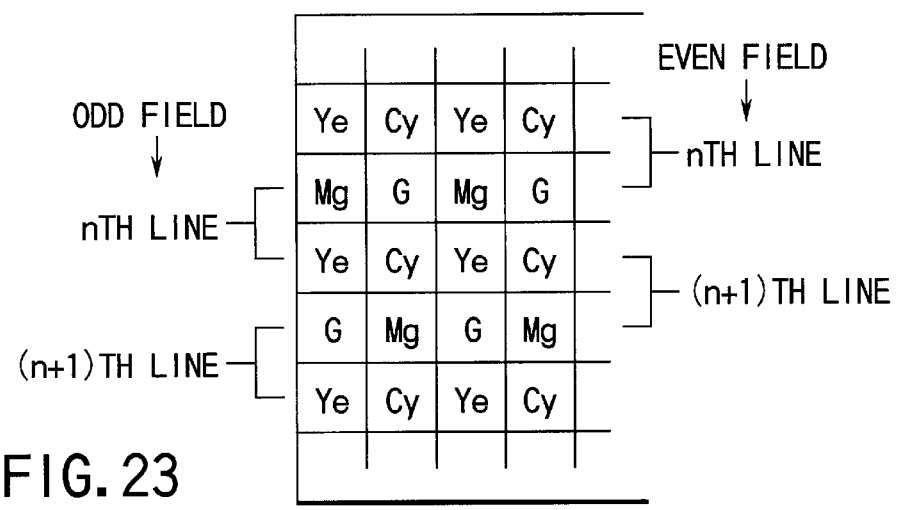
FIG. 23 is an explanatory view of the filter layout of a one CCD imaging element.

Region segmentation in step S33 is performed as shown in FIG. 21.

First, in step S33-1 the local region is scanned in units of pixels, and the next processing is performed. In step S33-2, a small region having a size of 3×3 is extracted. In step S33-3, color correlation of each color signal is regressed to a linear formula on the basis of equation (9). In step S33-4, the errors based on the maximum and minimum values are calculated on the basis of equations (13). In step S33-5, the maximum value of error is output. It is determined in step S33-6 whether all pixels have been scanned. If YES in step S33-6, the flow advances to step S33-7. Otherwise, the flow returns to step S33-1. In step S33-7, binarization is performed. In step S33-8, the region is segmented by labeling. In step S33-9, the image segmented into regions is output.

As described above, errors for regression of color correlations in a local region having a predetermined size are obtained, and the region is segmented to obtain regions having single color correlation. For each region, color correlation is regressed to a linear formula and calculated to restore a missing pixel. With this method, a high-frequency component can be restored, and an accurate reconstructed image can be obtained, unlike the conventional linear interpolation. In addition, since an image is segmented into uniform regions in advance, any false signal can also be prevented. Processing in this embodiment can be performed separately from the electronic still camera and therefore can generally be applied to a conventional electronic still camera. Since processing is performed in units of local regions, the memory capacity to be used is small, and the processing can be realized at low cost. In addition, since processing can be omitted as needed, wasteful processing need not be performed.

Segmentation using errors in this embodiment may be applied to the first and second embodiments.

The following invention is extracted from the above-described specific embodiments.

1. An image processing apparatus having a one CCD, two CCD, or three CCD with spatial pixel offset imaging system, comprising:

a parameter calculation section for sequentially scanning an image signal in units of pixels and calculating a parameter for region segmentation from at least one neighboring region containing a current pixel of interest;

an image signal segmentation section for segmenting the image signal into uniform regions having single color correlation on the basis of parameters calculated by the parameter calculation section;

a regression section for regressing, to a linear formula, the color correlation between color signals present in the uniform region segmented by the image signal segmentation section; and a first restoring section for restoring a missing color signal on the basis of the linear formula and a color signal present in the uniform region segmented by the image signal segmentation section.

Corresponding Embodiment of the Invention

An embodiment associated with this invention corresponds to at least the first embodiment shown in FIGS. 1 to 8 and the second embodiment shown in FIGS. 1, 2, and 9A to 13. The parameter calculation section in the arrangement corresponds to the neighboring region extraction section 106 and parameter calculation section 107 shown in FIG. 1. The image signal segmentation section in the arrangement corresponds to the image signal segmentation section 109 and uniform region extraction section 111 shown in FIG. 1. The regression section in the arrangement corresponds to the color correlation regression section 113 shown in FIG. 1. The restoring section in the arrangement corresponds to the missing pixel reconstruction section 114 shown in FIG. 1.

A preferable application example of the image processing apparatus of this invention is an image processing apparatus in which a neighboring region having a predetermined size is extracted by the neighboring region extraction section 106 in association with a signal from the processing switching section 105 shown in FIG. 1, region segmentation is performed by the parameter calculation section 107 and image signal segmentation section 109, and on the basis of this region segmentation, a missing color signal is restored by the color correlation regression section 113 and missing pixel reconstruction section 114 on the basis of a linear formula obtained by regressing color correlation shown FIG. 6 and transferred to the output section 117.

Function

An image signal is segmented into uniform regions having single color correlation in advance, and a missing color signal is restored on the basis of the color correlation in units of regions.

Effect

An image processing apparatus capable of accurately reconstructing a missing color signal at a high speed can be provided.

2. In the apparatus of 1, the parameter calculation section obtains a spectrum gradient from the color signals present in the neighboring region and calculates the parameter for region segmentation on the basis of the magnitude of the spectrum gradient.

Corresponding Embodiment of the Invention

An embodiment associated with this invention corresponds to at least the first embodiment shown in FIGS. 1 to 8. The parameter calculation section in the arrangement corresponds to the neighboring region extraction section 106 and parameter calculation section 107 shown in FIG. 1.

A preferable application example of the image processing apparatus of this invention is an image processing apparatus in which a neighboring region having a predetermined size is extracted by the neighboring region extraction section 106 in association with a signal from the processing switching section 105 shown in FIG. 1, and region segmentation is performed by the parameter calculation section 107 and image signal segmentation section 109 on the basis of the spectrum gradient in the neighboring region shown in FIG. 4.

Function

In reconstruction based on the color correlation, the image signal is segmented into uniform regions in accordance with the spectrum gradients, and a missing color signal is restored on the basis of the color correlation in units of regions.

Effect

An image processing apparatus capable of reducing false colors generated at the edges or color boundary portions without decreasing the resolution can be provided.

3. In the apparatus of 1, the parameter calculation section obtains a luminance signal from the color signals present in the neighboring region and calculates the parameter for region segmentation on the basis of the edge intensity of the luminance signal.

Corresponding Embodiment of the Invention

An embodiment associated with this invention corresponds to at least the second embodiment shown in FIGS. 1, 2, and 9A to 13. The parameter calculation section in the arrangement corresponds to the neighboring region extraction section 106 and parameter calculation section 107 shown in FIG. 1.

A preferable application example of the image processing apparatus of this invention is an image processing apparatus in which a neighboring region having a predetermined size is extracted by the neighboring region extraction section 106 in association with a signal from the processing switching section 105 shown in FIG. 1, and region segmentation is performed by the parameter calculation section 107 on the basis of the edge intensity of a luminance signal shown in FIG. 10.

Function

In reconstruction based on the color correlation, the image signal is segmented into uniform regions in accordance with the edge intensities of luminance signals, and a missing color signal is restored on the basis of the color correlation in units of regions.

Effect

The effect is the same as that of 2.

4. In the apparatus of 1, the parameter calculation section regresses, to a linear formula, the color correlation between the color signals present in the neighboring region and calculates the parameter for region segmentation on the basis of the constant term of the linear formula.

Corresponding Embodiment of the Invention

An embodiment associated with this invention corresponds to at least the third embodiment shown in FIGS. 14 to 18. The parameter calculation section in the arrangement corresponds to the color correlation regression section 315 shown in FIG. 14.

A preferable application example of the image processing apparatus of this invention is an image processing apparatus in which a neighboring region having a predetermined size is extracted by the local region extraction section 314 in association with a signal from the processing switching section 308 shown in FIG. 14, and region segmentation is performed by the color correlation regression section 315 on the basis of the constant terms of the linear formula of the color correlation in the local region shown in FIG. 16.

Function

In reconstruction based on the color correlation, the image signal is segmented into uniform regions in accordance with the constant terms of the linear formula of the color correlation, and a missing color signal is restored on the basis of the color correlation in units of regions.

Effect

The effect is the same as that of 2.

5. In the apparatus of 1, the parameter calculation section regresses, to a linear formula, the color correlation between the color signals present in the neighboring region and calculates the parameter for region segmentation on the basis of errors obtained by substituting the maximum value and the minimum value of the color signal used for regression into the linear formula.

Corresponding Embodiment of the Invention

An embodiment associated with this invention corresponds to at least the fourth embodiment shown in FIGS. 14, 15, 19, 20 and 21. The parameter calculation section in the arrangement corresponds to the color correlation regression section 315 shown in FIG. 14.

A preferable application example of the image processing apparatus of this invention is an image processing apparatus in which a neighboring region having a predetermined size is extracted by the local region extraction section 314 in association with a signal from the processing switching section 308 shown in FIG. 14, and region segmentation is performed by the color correlation regression section 315 on the basis of the errors obtained by substituting the maximum and minimum values in the linear formula of the color correlation shown in FIG. 19.

Function

In reconstruction based on the color correlation, the image signal is segmented into uniform regions on the basis of errors obtained by substituting the maximum and minimum values in the linear formula of the color correlation, and a missing color signal is restored on the basis of the color correlation in units of regions.

Effect

The effect is the same as that of 2.

6. The apparatus of 1 further comprises
a second restoring section for restoring the missing color signal of the image signal sensed by the imaging system by linear interpolation, and
a switching section for switching between the first restoring section and the second restoring section.

Corresponding Embodiment of the Invention

An embodiment associated with this invention corresponds to at least the first embodiment shown in FIGS. 1 to 8 and the second embodiment shown in FIGS. 1, 2, and 9A to 13. The second restoring section in the arrangement corresponds to the linear interpolation section 116 shown in FIG. 1. The first restoring section in the arrangement corresponds to the neighboring region extraction section 106, parameter calculation section 107, image signal segmentation section 109, uniform region extraction section 111, color correlation regression section 113, and missing pixel reconstruction section 114 shown in FIG. 1. The switching section in the arrangement corresponds to the processing switching section 105 shown in FIG. 1.

The image processing apparatus of this invention is an image processing apparatus in which image signal components from the input section 101 shown in FIGS. 1, 2, and 3A to 3C are stored in the R signal buffer 102, G signal buffer 103, and B signal buffer 104, processing reaching the linear interpolation 116 or the missing pixel reconstruction section 114 is selected by the processing switching section 105, when the linear interpolation 116 is selected, a missing color signal is restored by linear interpolation and transfers to the output section 117, and when processing reaching to the missing pixel reconstruction section 114 is selected, a missing color signal is restored by the color correlation regression section 113 and missing pixel reconstruction section 114 on the basis of the linear formula obtained by regressing color correlation shown in FIG. 6 and transferred to the output section 117.

Function

The apparatus has the restoring section for restoring a missing color signal on the basis of color correlation and the restoring section for restoring a missing color signal on the basis of linear interpolation and switches the two restoring sections.

Effect

An image processing apparatus capable of obtaining an appropriate image quality in an appropriate processing time can be provided.

7. In the apparatus of 6, the switching section automatically switches on the basis of the number of pixels of the image signal in sensing and the number of pixels required by an output medium or the use/non-use of electronic zoom.

Corresponding Embodiment of the Invention

An embodiment associated with this invention corresponds to at least the first embodiment shown in FIGS. 1 to 8 and the second embodiment shown in FIGS. 1, 2, and 9A to 13. The switching section in the arrangement corresponds to the processing switching section 105 shown in FIG. 1.

A preferable application example of the image processing apparatus of this invention is an image processing apparatus in which image signal components from the input section 101 shown in FIGS. 1, 2, and 3A to 3C are stored in the R signal buffer 102, G signal buffer 103, and B signal buffer 104, and processing reaching the linear interpolation 116 or the missing pixel reconstruction section 114 is selected by the processing switching section 105.

Function

The apparatus has the restoring section for restoring a missing color signal on the basis of color correlation and the restoring section for restoring a missing color signal on the basis of linear inter-polation, and automatically switches the two restoring sections on the basis of the number of pixels of the image signal in sensing and the number of pixels required by an output medium or the use/non-use of electronic zoom.

Effect

An image processing apparatus capable of obtaining an appropriate image quality in an appropriate processing time by automatic processing can be provided.

8. In the apparatus of 6, switching by the switching section is manually performed.

Corresponding Embodiment of the Invention

An embodiment associated with this invention corresponds to at least the first embodiment shown in FIGS. 1 to 8 and the second embodiment shown in FIGS. 1, 2, and 9A to 13. The switching section in the arrangement corresponds to the processing switching section 105 shown in FIG. 1.

A preferable application example of the image processing apparatus of this invention is an image processing apparatus in which image signal components from the input section 101 shown in FIGS. 1, 2, and 3A to 3C are stored in the R signal buffer 102, G signal buffer 103, and B signal buffer 104, and processing reaching the linear interpolation 116 or the missing pixel reconstruction section 114 is selected by the processing switching section 105.

Function

The apparatus has the restoring section for restoring a missing color signal on the basis of color correlation and the restoring section for restoring a missing color signal on the basis of linear interpolation, and the two restoring sections are manually switched.

Effect

An image processing apparatus capable of processing a signal while giving priority to the processing time or image quality of user's choice can be provided.

9. An image processing apparatus having a one CCD, two CCD, or three CCD with spatial pixel offset imaging system, comprising:
- a local region extraction section for sequentially scanning an image signal in units of pixels and extracting a local region containing a current pixel of interest;
- a parameter calculation section for setting a plurality of small regions in the local region extracted by the local region extraction section and calculating a parameter for region segmentation from each small region;
- a local region segmentation section for segmenting the local region into uniform regions having single color correlation on the basis of parameters calculated by the parameter calculation section;
- a selective regression section for selecting color signals belonging to the same region as that of the current pixel of interest in the local region segmented by the local region segmentation section on the basis of the uniform region and regressing color correlation between the color signals to a linear formula; and
- a first restoring section for selecting color signals belonging to the same region as that of the current pixel of interest in the local region segmented by the local region segmentation section on the basis of the uniform region and restoring a missing color signal in the same region as that of the current pixel of interest on the basis of the color signals and the linear formula.

Corresponding Embodiment of the Invention

An embodiment associated with this invention corresponds to at least the third embodiment shown in FIGS. 14 to 18 and the fourth embodiment shown in FIGS. 14, 15, and 19 to 21. The local region extraction section in the arrangement corresponds to the local region extraction section 314 shown in FIG. 14. The parameter calculation section in the arrangement corresponds to the color correlation regression section 315 shown in FIG. 14. The local region segmentation section in the arrangement corresponds to the local region segmentation section 317 shown in FIG. 14. The selective regression section in the arrangement corresponds to the uniform region extraction section 319 and color correlation regression section 321 shown in FIG. 14. The first restoring section in the arrangement corresponds to the missing pixel reconstruction section 322 and adding/averaging section 324 shown in FIG. 14.

A preferable application example of the image processing apparatus of this invention is an image processing apparatus in which a local region having a predetermined size is extracted by the local region extraction section 314 in association with a signal from the processing switching section 308 shown in FIG. 14, region segmentation is performed by the color correlation regression section 315 and local region segmentation section 317, a missing color signal is restored, on the basis of this region segmentation, by the color correlation regression section 321 and missing pixel reconstruction section 322 on the basis of a linear formula obtained by regressing color correlation, and the color signal restored in duplicate is averaged by the adding/averaging section 324 and transferred to the output section 325.

Function

Local regions are sequentially extracted from an image signal, each local region is segmented into uniform regions having single color correlation, and a missing color signal in the same uniform region as that of the current pixel of interest is restored on the basis of the color correlation.

Effect

An image processing apparatus capable of accurately reconstructing a missing color signal at low cost can be provided.

10. In the apparatus of 9, the parameter calculation section obtains a spectrum gradient from the color signals present in the small region and calculates the parameter for region segmentation on the basis of the magnitude of the spectrum gradient.

Corresponding Embodiment of the Invention

An embodiment associated with this invention corresponds to at least the first embodiment shown in FIGS. 1 to 8. The parameter calculation section in the arrangement corresponds to the neighboring region extraction section 106 and parameter calculation section 107 shown in FIG. 1.

A preferable application example of the image processing apparatus of this invention is an image processing apparatus in which a neighboring region having a predetermined size is extracted by the neighboring region extraction section 106 in association with a signal from the processing switching section 105 shown in FIG. 1, and region segmentation is performed by the parameter calculation section 107 and image signal segmentation section 109 on the basis of the spectrum gradient in the neighboring region shown in FIG. 4.

Function

In reconstruction based on the color correlation, the image signal is segmented into uniform regions in accordance with the spectrum gradients, and a missing color signal is restored on the basis of the color correlation in units of regions.

Effect

An image processing apparatus capable of reducing false colors generated at the edges or color boundary portions without decreasing resolution can be provided.

11. In the apparatus of 9, the parameter calculation section obtains a luminance signal from the color signals present in the small region and calculates the parameter for region segmentation on the basis of the edge intensity of the luminance signal.

Corresponding Embodiment of the Invention

An embodiment associated with this invention corresponds to at least the second embodiment shown in FIGS. 1, 2, and 9A to 13. The parameter calculation section in the arrangement corresponds to the neighboring region extraction section 106 and parameter calculation section 107 shown in FIG. 1.

A preferable application example of the image processing apparatus of this invention is an image processing apparatus in which a neighboring region having a predetermined size is extracted by the neighboring region extraction section 106 in association with a signal from the processing switching section 105 shown in FIG. 1, and region segmentation is performed by the parameter calculation section 107 on the basis of the edge intensity of a luminance signal shown in FIG. 10.

Function

In reconstruction based on the color correlation, the image signal is segmented into uniform regions in accordance with the edge intensities of luminance signals, and a missing color signal is restored on the basis of the color correlation in units of regions.

Effect

An image processing apparatus capable of reducing false colors generated at the edges or color boundary portions without decreasing the resolution can be provided.

12. In the apparatus of 9, the parameter calculation section regresses, to a linear formula, the color correlation between the color signals present in the small region and calculates the parameter for region segmentation on the basis of the constant term of the linear formula.

Corresponding Embodiment of the Invention

An embodiment associated with this invention corresponds to at least the third embodiment shown in FIGS. 14 to 18. The parameter calculation section in the arrangement corresponds to the color correlation regression section 315 shown in FIG. 14.

A preferable application example of the image processing apparatus of this invention is an image processing apparatus in which a neighboring region having a predetermined size is extracted by the local region extraction section 314 in association with a signal from the processing switching section 308 shown in FIG. 14, and region segmentation is performed by the color correlation regression section 315 on the basis of the constant terms of the linear formula of the color correlation in the local region shown in FIG. 16.

Function

In reconstruction based on the color correlation, the image signal is segmented into uniform regions in accordance with the constant terms of the linear formula of the color correlation, and a missing color signal is restored on the basis of the color correlation in units of regions.

Effect

An image processing apparatus capable of reducing false colors generated at the edges or color boundary portions without decreasing resolution can be provided.

13. In the apparatus of 9, the parameter calculation section regresses, to a linear formula, the color correlation between the color signals present in the small region and calculates the parameter for region segmentation on the basis of errors obtained by substituting the maximum value and the minimum value of the color signal used for regression into the linear formula.

Corresponding Embodiment of the Invention

An embodiment associated with this invention corresponds to at least the fourth embodiment shown in FIGS. 14, 15, and 19 to 21. The parameter calculation section in the arrangement corresponds to the color correlation regression section 315 shown in FIG. 14.

A preferable application example of the image processing apparatus of this invention is an image processing apparatus in which a neighboring region having a predetermined size is extracted by the local region extraction section 314 in association with a signal from the processing switching section 308 shown in FIG. 14, and region segmentation is performed by the color correlation regression section 315 on the basis of the errors obtained by substituting the maximum and minimum values in the linear formula of the color correlation shown in FIG. 19.

Function

In reconstruction based on the color correlation, the image signal is segmented into uniform regions on the basis of errors obtained by substituting the maximum and minimum values in the linear formula of the color correlation, and a missing color signal is restored on the basis of the color correlation in units of regions.

Effect

An image processing apparatus capable of reducing false colors generated at the edges or color boundary portions without decreasing resolution can be provided.

14. The apparatus of 9 further comprises
a second restoring section for restoring the missing color signal of the image signal sensed by the imaging system by linear interpolation, and
a switching section for switching between the first restoring section and the second restoring section.

(Corresponding Embodiment of the Invention), (Function), and (Effect) are the same as those of 6.

15. In the apparatus of 14, the switching section automatically switches on the basis of the number of pixels of the image signal in sensing and the number of pixels required by an output medium or the use/non-use of electronic zoom.

(Corresponding Embodiment of the Invention), (Function), and (Effect) are the same as those of 7.

16. In the apparatus of 14, switching by the switching section is manually performed.

(Corresponding Embodiment of the Invention), (Function), and (Effect) are the same as those of 8.

17. An image processing apparatus having a one CCD, two CCD, or three CCD with spatial pixel offset imaging system, comprising:
   a first restoring section for restoring a missing color signal of an image signal sensed by the imaging system by linear interpolation;
   a conversion section for converting the image signal restored by the first restoring section into an original image signal obtained by the imaging system;
   a second restoring section for restoring a missing color signal of the image signal converted by the conversion section on the basis of color correlation between color signals; and
   a switching section for switching between the conversion section and the second restoring section.

Corresponding Embodiment of the Invention

An embodiment associated with this invention corresponds to at least the third embodiment shown in FIGS. 14 to 18 and the fourth embodiment shown in FIGS. 14, 15, and 19 to 21. The first restoring section in the arrangement corresponds to the linear interpolation section 305 shown in FIG. 14. The conversion section in the arrangement corresponds to the conversion section 309 shown in FIG. 14. The second restoring section in the arrangement corresponds to the local region extraction section 314, color correlation regression section 315, local region segmentation section 317, uniform region extraction section 319, color correlation regression section 321, missing pixel reconstruction section 322, and adding/averaging section 324 shown in FIG. 14. The switching section in the arrangement corresponds to the processing switching section 308 shown in FIG. 14.

A preferable application example of the image processing apparatus of this invention is an image processing apparatus in which image signal components from the input section 301 shown in FIGS. 14 and 15 are stored in the R signal buffer 302, G signal buffer 303, and B signal buffer 304, and a missing color signal is reconstructed by the linear interpolation section 305 and output to the memory card 306. The image signal on the memory card is read by the card reading section 307, and inhibition of processing for the image signal or processing reaching the adding/averaging section 324 is selected by the processing switching section 308. When the former is selected, the image signal on the memory card is directly transferred to the output section 325. When processing reaching the adding/averaging section 324 is selected, a missing color signal is restored by the color correlation regression section 321 and missing pixel reconstruction section 322 on the basis of a linear formula obtained by regressing color correlation and transferred to the output section 325.

Function

The apparatus has a restoring section for restoring a missing color signal on the basis of linear interpolation and a restoring section for converting the restored color signal into the original image signal on the basis of information of the imaging system and then restoring the missing color signal from this image signal on the basis of the color correlation. The latter restoring section can be omitted.

Effect

An image processing apparatus capable of accurately reconstructing even a color signal that has undergone processing such as linear interpolation can be provided.

18. In the apparatus of 17, the switching section automatically switches on the basis of the number of pixels of the image signal in sensing and the number of pixels required by an output medium or the use/non-use of electronic zoom.

(Corresponding Embodiment of the Invention), (Function), and (Effect) are the same as those of 7.

19. Switching by the switching section is manually performed.

(Corresponding Embodiment of the Invention), (Function), and (Effect) are the same as those of 8.

20. A computer-readable storage medium which stores a program comprising an instruction causing a computer to execute:
   parameter calculation processing of sequentially scanning, in units of pixels, an image signal obtained by imaging with a one CCD, two CCD, or three CCD with spatial pixel offset imaging system and calculating a parameter for region segmentation from at least one neighboring region containing a current pixel of interest;
   image signal segmentation processing of segmenting the image signal into uniform regions having single color correlation on the basis of calculated parameters;
   regression processing of regressing, to a linear formula, the color correlation between color signals in the uniform region; and
   restoring processing of restoring a missing color signal on the basis of the linear formula and the color signals present in the uniform region.

(Corresponding Embodiment of the Invention), (Function), and (Effect) are the same as those of 1.

21. A computer-readable storage medium which stores a program comprising an instruction causing a computer to execute:
   local region extraction processing of sequentially scanning, in units of pixels, an image signal obtained by imaging with a one CCD, two CCD, or three CCD with spatial pixel offset imaging system and extracting a local region containing a current pixel of interest;
   parameter calculation processing of setting a plurality of small regions in the extracted local region and calculating a parameter for region segmentation from each small region;
   local region segmentation processing of segmenting the local region into uniform regions having single color correlation on the basis of calculated parameters;
   selective regression processing of selecting color signals belonging to the same region as that of the current pixel of interest in the local region on the basis of the uniform region and regressing color correlation between the color signals to a linear formula; and
   selective restoring processing of selecting color signals belonging to the same region as that of the current pixel of interest in the local region on the basis of the uniform region and restoring a missing color signal in the same region as that of the current pixel of interest on the basis of the color signals and the linear formula.

(Corresponding Embodiment of the Invention), (Function), and (Effect) are the same as those of 9.

22. A computer-readable storage medium which stores a program comprising an instruction causing a computer to execute:
   first restoring processing of restoring a missing color signal of an image signal obtained by imaging with a one CCD, two CCD, or three CCD with spatial pixel offset imaging system by linear interpolation;

conversion processing of converting the image signal restored by the first restoring processing into an original image signal obtained by the imaging system;

second restoring processing of restoring a missing color signal of the converted image signal on the basis of color correlation between color signals; and switching processing of switching between the conversion processing and the second restoring processing.

(Corresponding Embodiment of the Invention), (Function), and (Effect) are the same as those of 17.

According to the above embodiments, an image processing apparatus capable of accurately reconstructing a missing color signal at a high speed can be provided.

An image processing apparatus capable of reducing false colors generated at the edges or color boundary portions without decreasing resolution can also be provided.

An image processing apparatus capable of obtaining an appropriate image quality in an appropriate processing time can also be provided.

An image processing apparatus capable of obtaining an appropriate image quality in an appropriate processing time by automatic processing can also be provided.

An image processing apparatus capable of processing a signal while giving priority to the processing time or image quality of user's choice can also be provided.

An image processing apparatus capable of accurately reconstructing a missing color signal at low cost can be provided.

An image processing apparatus capable of accurately reconstructing even a color signal that has undergone processing such as linear interpolation can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus having a one CCD, two CCD, or three CCD with spatial pixel offset imaging system, comprising:

a parameter calculation section for sequentially scanning an image signal in units of pixels and calculating a parameter for region segmentation from at least one neighboring region containing a current pixel of interest;

an image signal segmentation section for segmenting the image signal into uniform regions having single color correlation on the basis of parameters calculated by said parameter calculation section;

a regression section for regressing, to a linear formula, the color correlation between color signals present in the uniform region segmented by said image signal segmentation section; and a first restoring section for restoring a missing color signal on the basis of the linear formula and the color signals present in the uniform region segmented by said image signal segmentation section.

2. An apparatus according to claim 1, wherein said parameter calculation section obtains a spectrum gradient from the color signals present in the neighboring region and calculates the parameter for region segmentation on the basis of a magnitude of the spectrum gradient.

3. An apparatus according to claim 1, wherein said parameter calculation section obtains a luminance signal from the color signals present in the neighboring region and calculates the parameter for region segmentation on the basis of an edge intensity of the luminance signal.

4. An apparatus according to claim 1, wherein said parameter calculation section regresses, to the linear formula, the color correlation between the color signals present in the neighboring region and calculates the parameter for region segmentation on the basis of a constant term of the linear formula.

5. An apparatus according to claim 1, wherein said parameter calculation section regresses, to the linear formula, the color correlation between the color signals present in the neighboring region and calculates the parameter for region segmentation on the basis of errors obtained by substituting a maximum value and a minimum value of the color signal used for regression into the linear formula.

6. An apparatus according to claim 1, further comprising a second restoring section for restoring the missing color signal of the image signal sensed by said imaging system by linear interpolation, and a switching section for switching between said first restoring section and said second restoring section.

7. An apparatus according to claim 6, wherein said switching section automatically switches on the basis of the number of pixels of the image signal in sensing and the number of pixels required by an output medium or the use/non-use of electronic zoom.

8. An apparatus according to claim 6, wherein switching by said switching section is manually performed.

9. An image processing apparatus having a one CCD, two CCD, or three CCD with spatial pixel offset imaging system, comprising:

a local region extraction section for sequentially scanning an image signal in units of pixels and extracting a local region containing a current pixel of interest;

a parameter calculation section for setting a plurality of small regions in the local region extracted by said local region extraction section and calculating a parameter for region segmentation from each small region;

a local region segmentation section for segmenting the local region into uniform regions having single color correlation on the basis of parameters calculated by said parameter calculation section;

a selective regression section for selecting color signals belonging to the same region as that of the current pixel of interest in the local region segmented by said local region segmentation section on the basis of the uniform region and regressing color correlation between the color signals to a linear formula; and a first restoring section for selecting color signals belonging to the same region as that of the current pixel of interest in the local region segmented by said local region segmentation section on the basis of the uniform region and restoring a missing color signal in the same region as that of the current pixel of interest on the basis of the color signals and the linear formula.

10. An apparatus according to claim 9, wherein said parameter calculation section obtains a spectrum gradient from the color signals present in the small region and calculates the parameter for region segmentation on the basis of a magnitude of the spectrum gradient.

11. An apparatus according to claim 9, wherein said parameter calculation section obtains a luminance signal from the color signals present in the small region and calculates the parameter for region segmentation on the basis of an edge intensity of the luminance signal.

12. An apparatus according to claim 9, wherein said parameter calculation section regresses, to the linear formula, the color correlation between the color signals present in the small region and calculates the parameter for region segmentation on the basis of a constant term of the linear formula.

13. An apparatus according to claim 9, wherein said parameter calculation section regresses, to the linear formula, the color correlation between the color signals present in the small region and calculates the parameter for region segmentation on the basis of errors obtained by substituting a maximum value and a minimum value of the color signal used for regression into the linear formula.

14. An apparatus according to claim 9, further comprising
a second restoring section for restoring the missing color signal of the image signal sensed by said imaging system by linear interpolation, and
a switching section for switching between said first restoring section and said second restoring section.

15. An apparatus according to claim 14, wherein said switching section automatically switches on the basis of the number of pixels of the image signal in sensing and the number of pixels required by an output medium or the use/non-use of electronic zoom.

16. An apparatus according to claim 14, wherein switching by said switching section is manually performed.

17. An image processing apparatus having a one CCD, two CCD, or three CCD with spatial pixel offset imaging system, comprising:
a first restoring section for restoring a missing color signal of an image signal sensed by said imaging system by linear interpolation;
a conversion section for converting the image signal restored by said first restoring section into an original image signal obtained by said imaging system;
a second restoring section for restoring a missing color signal of the image signal converted by said conversion section on the basis of color correlation between color signals; and
a switching section for switching between said conversion section and said second restoring section.

18. An apparatus according to claim 17, wherein said switching section automatically switches on the basis of the number of pixels of the image signal in sensing and the number of pixels required by an output medium or the use/non-use of electronic zoom.

19. An apparatus according to claim 17, wherein switching by said switching section is manually performed.

20. A computer-readable storage medium which stores a program comprising an instruction causing a computer to execute:
parameter calculation processing of sequentially scanning, in units of pixels, an image signal obtained by imaging with a one CCD, two CCD, or three CCD with spatial pixel offset imaging system and calculating a parameter for region segmentation from at least one neighboring region containing a current pixel of interest;
image signal segmentation processing of segmenting the image signal into uniform regions having single color correlation on the basis of calculated parameters;
regression processing of regressing, to a linear formula, the color correlation between color signals in the uniform region; and
restoring processing of restoring a missing color signal on the basis of the linear formula and the color signals present in the uniform region.

21. A computer-readable storage medium which stores a program comprising an instruction causing a computer to execute:
local region extraction processing of sequentially scanning, in units of pixels, an image signal obtained by imaging with a one CCD, two CCD, or three CCD with spatial pixel offset imaging system and extracting a local region containing a current pixel of interest;
parameter calculation processing of setting a plurality of small regions in the extracted local region and calculating a parameter for region segmentation from each small region;
local region segmentation processing of segmenting the local region into uniform regions having single color correlation on the basis of calculated parameters;
selective regression processing of selecting color signals belonging to the same region as that of the current pixel of interest in the local region on the basis of the uniform region and regressing color correlation between the color signals to a linear formula; and
selective restoring processing of selecting color signals belonging to the same region as that of the current pixel of interest in the local region on the basis of the uniform region and restoring a missing color signal in the same region as that of the current pixel of interest on the basis of the color signals and the linear formula.

22. A computer-readable storage medium which stores a program comprising an instruction causing a computer to execute:
first restoring processing of restoring a missing color signal of an image signal obtained by imaging with a one CCD, two CCD, or three CCD with spatial pixel offset imaging system by linear interpolation;
conversion processing of converting the image signal restored by the first restoring processing into an original image signal obtained by said imaging system;
second restoring processing of restoring a missing color signal of the converted image signal on the basis of color correlation between color signals; and
switching processing of switching between the conversion processing and the second restoring processing.

* * * * *